(12) United States Patent
Iwase et al.

(10) Patent No.: US 7,259,886 B2
(45) Date of Patent: Aug. 21, 2007

(54) PRINTING SYSTEM

(75) Inventors: Akinori Iwase, Yokosuka (JP); Tatsuya Haraguchi, Yokohama (JP); Kazuhiro Ogura, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 13 days.

(21) Appl. No.: 11/348,442

(22) Filed: Feb. 7, 2006

(65) Prior Publication Data

US 2006/0158689 A1 Jul. 20, 2006

Related U.S. Application Data

(62) Division of application No. 09/946,620, filed on Sep. 6, 2001, now abandoned.

(51) Int. Cl.
*G06F 15/00* (2006.01)

(52) U.S. Cl. ............. 358/1.15; 358/402; 358/403

(58) Field of Classification Search ............ 358/1.15, 358/402, 403, 442, 468, 1.14; 709/223, 246, 709/206, 224; 705/12; 710/19; 382/115; 379/93.24, 110

See application file for complete search history.

(56) References Cited

U.S. PATENT DOCUMENTS

| | | | |
|---|---|---|---|
| 2001/0017712 A1* | 8/2001 | Kasatani | .......... 358/1.15 |
| 2001/0029531 A1 | 10/2001 | Ohta | |
| 2002/0022478 A1 | 2/2002 | Iwao | |
| 2004/0167967 A1 | 8/2004 | Bastian et al. | |

FOREIGN PATENT DOCUMENTS

| | | |
|---|---|---|
| JP | 10-254752 A | 9/1998 |
| JP | 2000-339237 A | 12/2000 |

* cited by examiner

*Primary Examiner*—King Y. Poon
*Assistant Examiner*—Saeid Ebrahimi
(74) *Attorney, Agent, or Firm*—Foley & Lardner LLP

(57) ABSTRACT

In this printing system, in case of carrying out printing from a personal computer, PDA (personal digital assistants), and portable telephone, the printing data are transmitted through internet to a server by using the printing data as a mail, temporarily stored in a server, and then transferred to a digital copying machine to print. In the server, at the time of receiving the mail as the printing data, control is made of the action to store the printing data in a memory or a hard disk drive.

6 Claims, 40 Drawing Sheets

| Mail ID | Group ID | Date & time of receipt of initial mail | Date & time of receipt of this mail | Serial no | Content |
|---|---|---|---|---|---|
| 12BXCV | 001 | 2001/02/01 13:15:35 | 2001/02/01 13:15:35 | 2/3 | File123 |
| 11BXCV | 001 | 2001/02/01 13:15:35 | 2001/02/01 13:15:40 | 1/3 | File124 |
| HHK456 | 012 | 2001/02/01 10:40:10 | 2001/02/01 10:40:10 | 3/5 | File345 |
| | | | | | |

FIG. 19

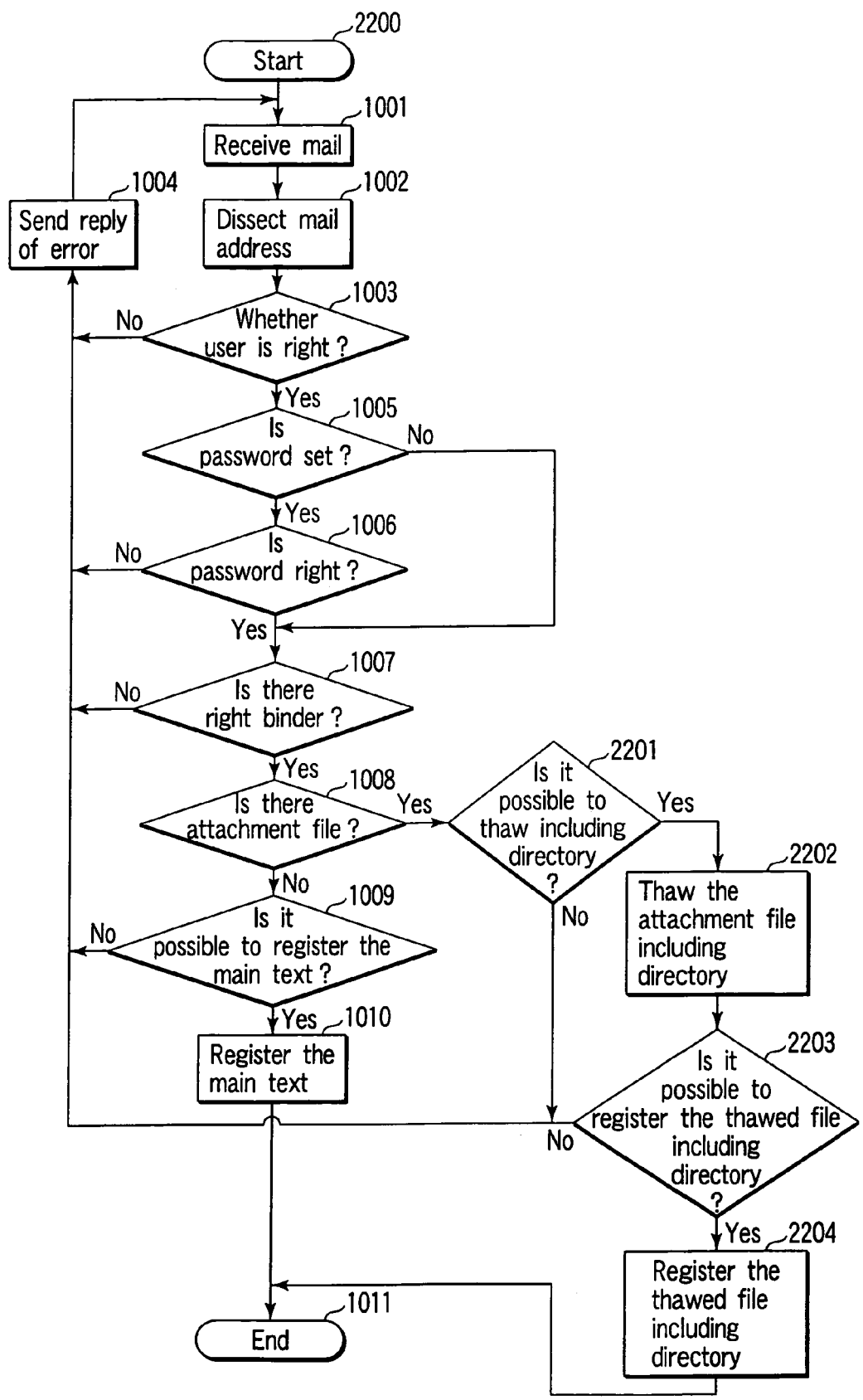
F I G. 32

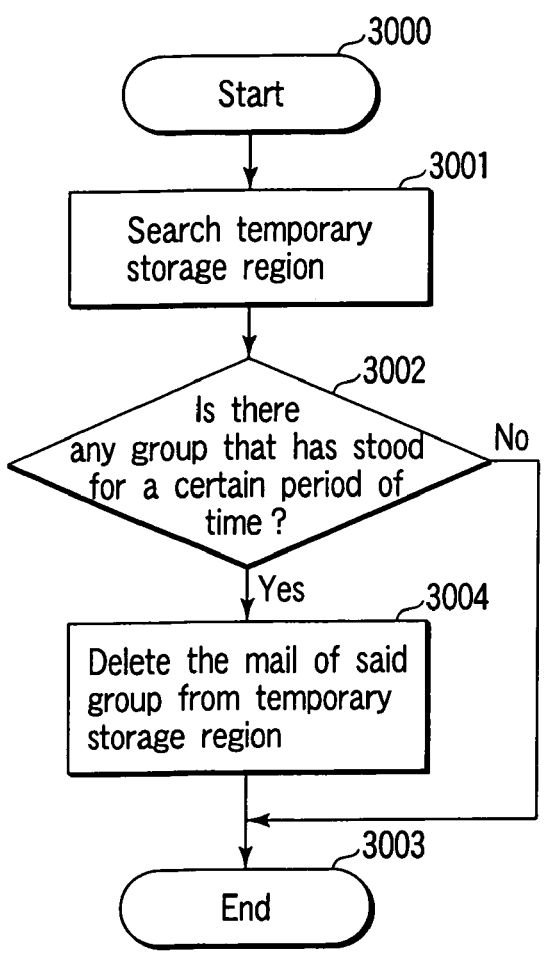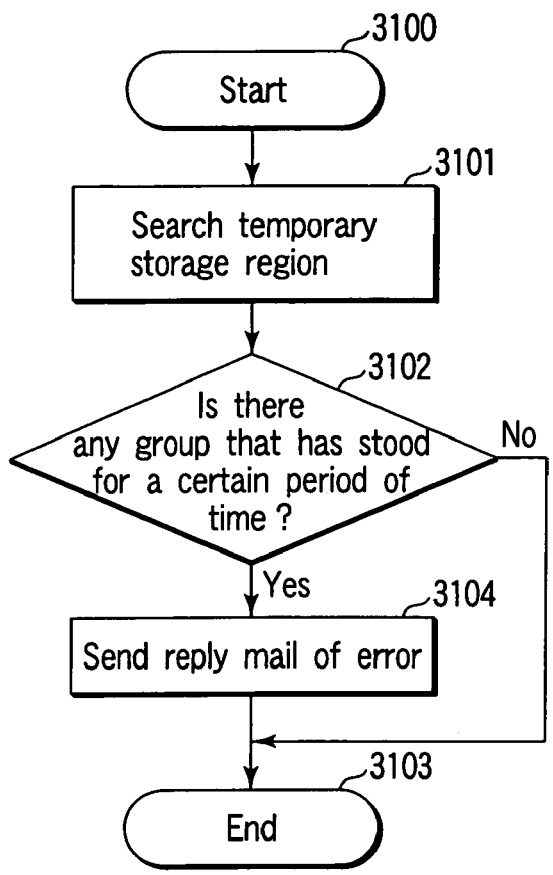
FIG. 40
FIG. 41

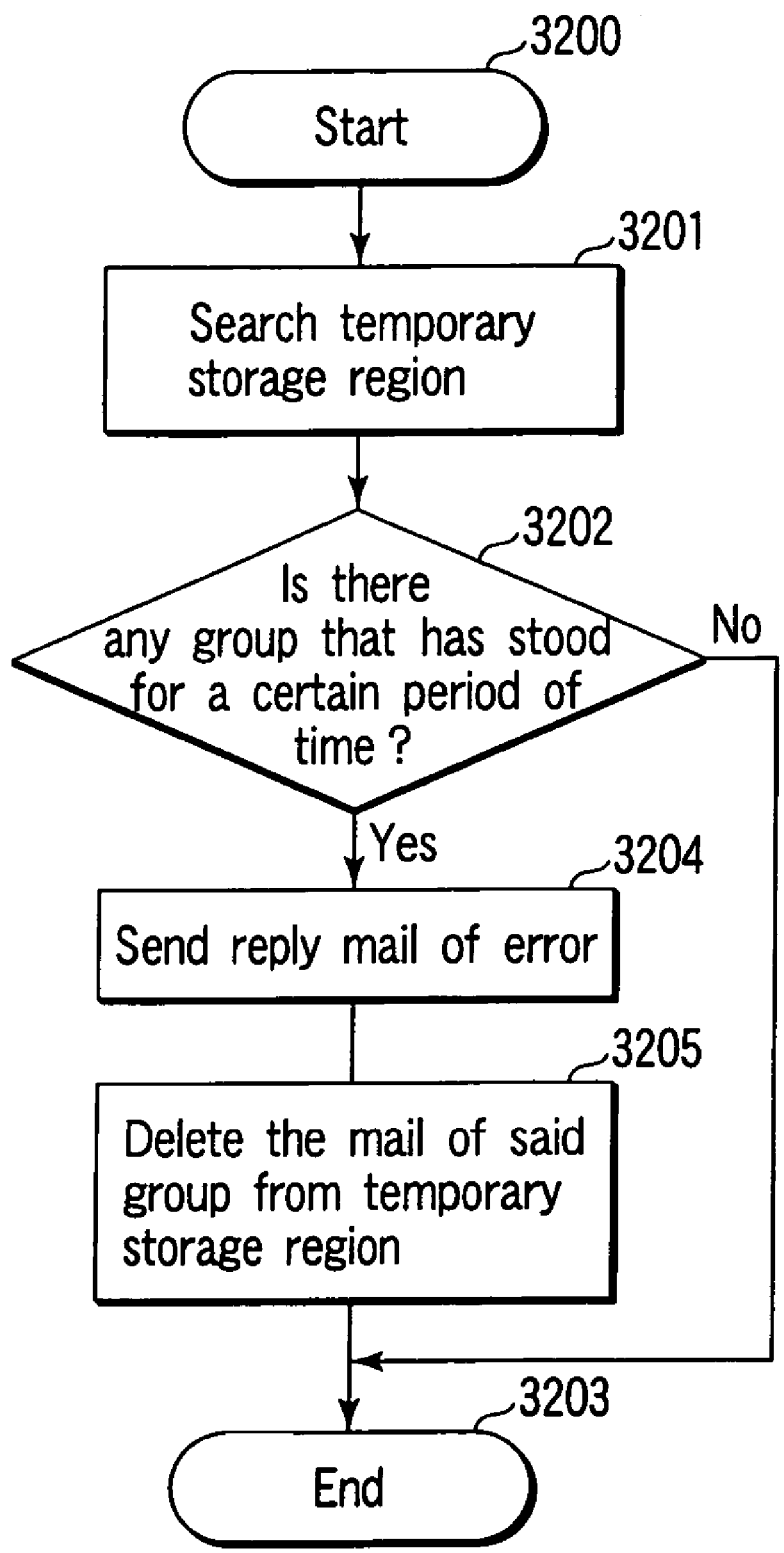
F I G. 42

PRINTING SYSTEM

The present application is a divisional of U.S. application Ser. No. 09/946,620, filed Sep. 6, 2001, now abandoned the entire contents of which are incorporated herein by reference.

BACKGROUND OF THE INVENTION

The present invention relates to a printing system designed to print various data files including, for example, image data, document data, HTML style document, etc. that are received from a server by means of mail using a personal computer or a portable telephone, or PDA.

In recent years, portable terminals such as portable telephone units or PDA have come to be widely popularized. Many of these portable terminals have function to connect Internet. Also, many personal computers (PC) have function to connect Internet. These PC and portable terminals having function to connect Internet perform sending and receiving data by utilizing electronic mail (hereinafter to be referred to as mail) through Internet. It is desired for these portable terminals and PC to transmit data through Internet and print data with ease.

For example, there is shown in Jpn. Pat. Appln. KOKAI Publication No. 10-254752 a technique to store documents (data) in a document control server by means of mail. Besides, Jpn. Pat. Appln. KOKAI Publication No. 2000-339237 shows a technique to transmit documents (data) to a printing apparatus through mail and print said documents with a printing apparatus.

However, it is desired for the user to print the document of own selection freely at any time anywhere. Moreover, it is desired to instruct printing to any means without discriminating the portable terminal or PC and effect printing with the preferred printer at any time anywhere.

Furthermore, it is desired that printing instructions may be freely sent to any apparatus connected to Internet, and printing may be done with the printer connected to Internet at any time anywhere. And, it is desired that various instructions can be given from the apparatuses connected to Internet.

With the conventional apparatuses, it is not free for the apparatuses connected to Internet to make setting of printing or setting of printing place. Especially, in printing with a portable telephone or a PDA, it is extremely difficult to instruct what to print where in printing, because there is no printing apparatus direct at hand.

BRIEF SUMMARY OF THE INVENTION

This printing system has been invented to settle the problematic points as described above. This is a system that can be used for printing in the same manner of handling with the Internet connected apparatuses, without discrimination between the portable terminal user and the PC user. Concretely, various instructions may be given by mail to the server for storing the document, and printing may be done with a printer connected to Internet through the server. By this system, the document to be printed can be instructed easily at any time, and it becomes possible to practice printing at any time.

This invention has its object to provide a printing system in which printing can be performed with ease from the apparatuses connected to Internet.

In order to attain the object described above,

This invention provides a printing system comprising a server for carrying out transmitting and receiving of mail with information apparatuses through a communication line or a network and a printing apparatus for carrying out printing by acquiring the printing information stored in the server, the server being equipped with a receiving part for receiving a mail having a user ID and printing information transmitted from the information apparatus and a control part for carrying out control to store the printing information given to the mail received in the receiving part in the storing region provided in coordination with the user ID given to the mail.

This invention provides a printing system comprising a server for carrying out transmitting and receiving of mail with information apparatuses through a communication line or a network and a printing apparatus for carrying out printing by acquiring the printing information stored in the server, the server being equipped with a receiving part for receiving a mail having a user ID, identification information, and printing information transmitted from the information apparatus, a judging part for judging whether the user is genuine or not from the user ID given to the mail received in the receiving part, and a control part for carrying out control, when judged to be genuine in the judging part, to store the printing information given to the mail in the storing region provided in coordination with the user ID given to the mail.

This invention provides a printing system comprising a server for carrying out transmitting and receiving of mail with information apparatuses through a communication line or a network and a printing apparatus for carrying out printing by acquiring the printing information stored in the server, the server being equipped with a receiving part for receiving a mail having a user ID and printing information transmitted from the information apparatus, a judging part for judging whether the user ID given to the mail received in the receiving part is stored in advance or not, and a control part for carrying out control, when judged in the judging part that the user ID has not been stored, to give reply mail to the transmitter of the mail to the effect that the user ID has not been stored.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 19 is a view showing an example of constitution of divisional mail control table;

FIG. 32 is a flow chart for explaining the registration action of the server in the printing system according to the thirteenth example;

FIG. 40 is a flow chart for explaining the action of the server in the twenty-first example;

FIG. 41 is a flow chart for explaining the action of the server in the twenty-second example; and FIG. 42 is a flow chart for explaining the action of the server in the twenty third example.

DETAILED DESCRIPTION OF THE INVENTION

Figure 1:
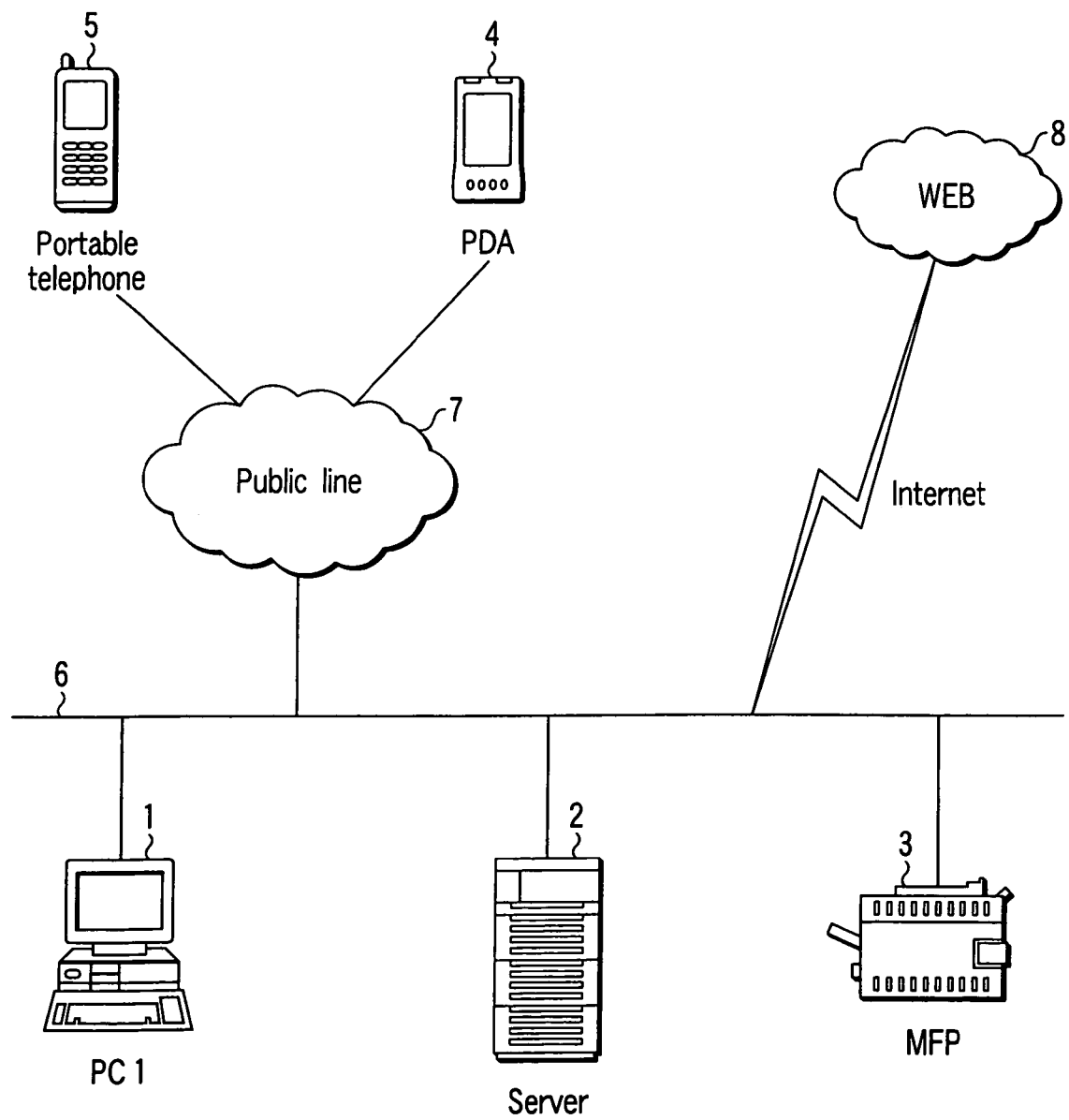
FIG. 1 is a block diagram showing a brief constitution of the printing system according to this invention.

Hereinafter, an example of the invention is explained with reference to the drawing.

As shown in FIG. 1, the printing system according to this invention has a portable terminal unit personal computer (PC) 1, a server 2, a digital compound machine (MFP) 3, and a portable terminal such as PDA 4 or a portable telephone unit 5. PC1, server 2, and digital compound machine (MFP (MULTI FUNCTIONAL PERIPHERAL)) 3 are mutually connected through the network 6. The portable terminal such as PDA (Personal digital assistants) 4 or portable telephone unit 5 is connected to the network 6 through the public line 7.

PC1 is connected to the network 6.

A server 2 has functions to store various data, to make control of mail, to act as WEB server, etc.

MFP 3 acts as a printer on the network 6, besides the function of copying machine.

PDA 4 is furnished with a communication module for connection with the public line 7, and is capable of using sufficiently the function of the network. For example, in PDA 4, it is possible to observe WEB (world wide web) by using WEB, or to send/receive electronic mail (hereinafter, to be mail).

Portable telephone unit 5 can be sufficiently utilized for the function of the network by being connected to the network through the public line. For example, with the portable telephone unit 5, in the same manner as with PDA 4, it is possible to observe WEB by using WEB browser, or to send/receive mail.

Network 6 is connected to Internet, and connected with various WEB servers 8.

Next, explanation is given on the schematic constitution of PC1 hardware.

Figure 2:
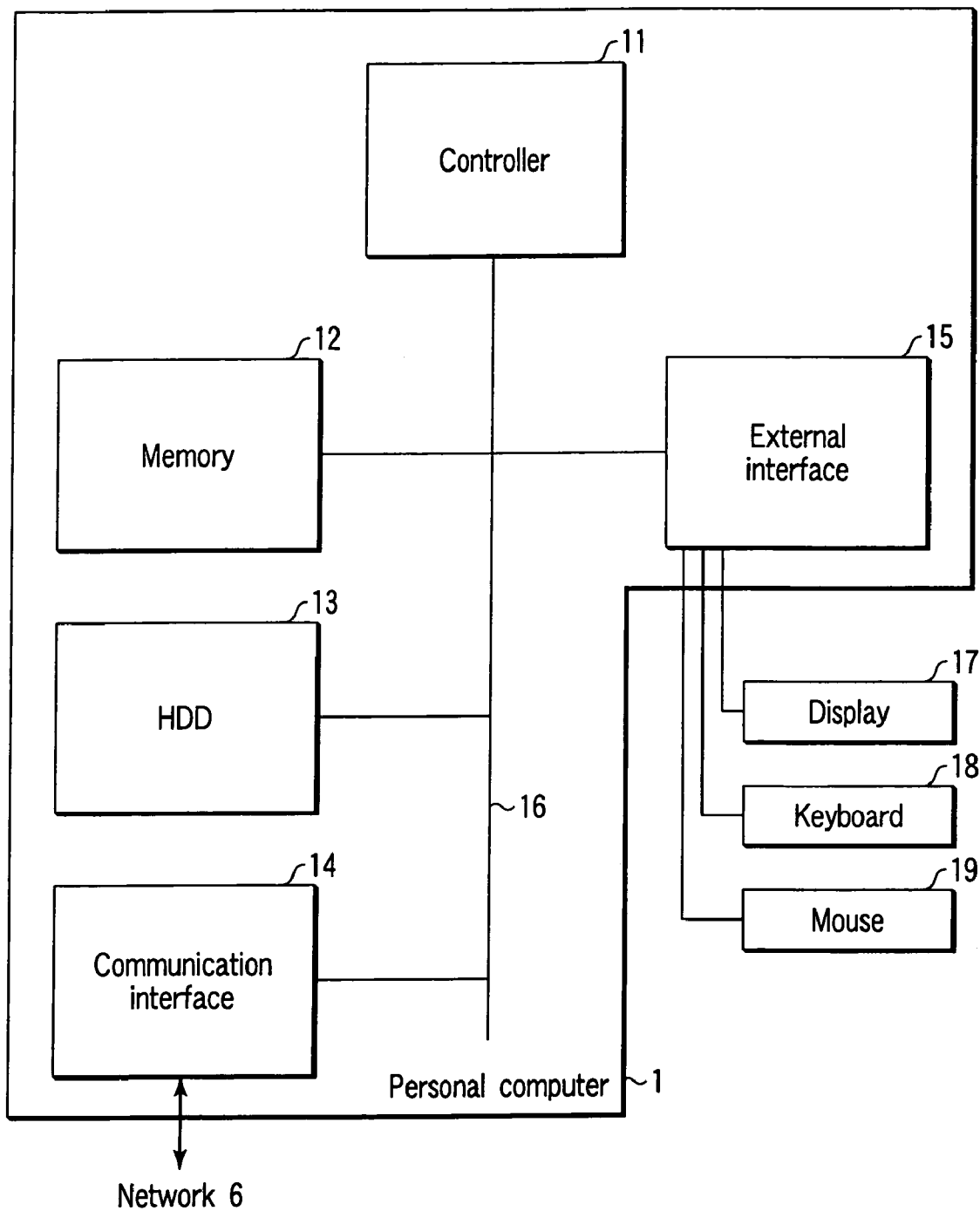
FIG. 2 is a schematic view of the constitution of the hardware of a personal computer.

FIG. 2 schematically shows the constitution of PC1 hardware. As shown in FIG. 2, PC1 is constituted by a controller 11, memory 12, hard disk drive (HDD) 13, communication interface 14, and external interface 15. These constitution elements are connected through a bus 16.

The controller 11 is constituted by CPU, and controls the operation of whole PC1. The memory 12 stores the data and the like for the PC1 to perform operation. In HDD 13 program and data are stored. The communication interface 14 is an interface with the network 6.

In this PC1, the data and the like from the outside source are sent to and received by the network 6 through the communication interface 14. The outside interface 15 is an interface of the circumferential apparatuses such as display 17, keyboard 18, mouse 19, and the like to be connected to the PC1.

Next, explanation is given on a schematic constitution of hardware of the server 2.

Figure 3:
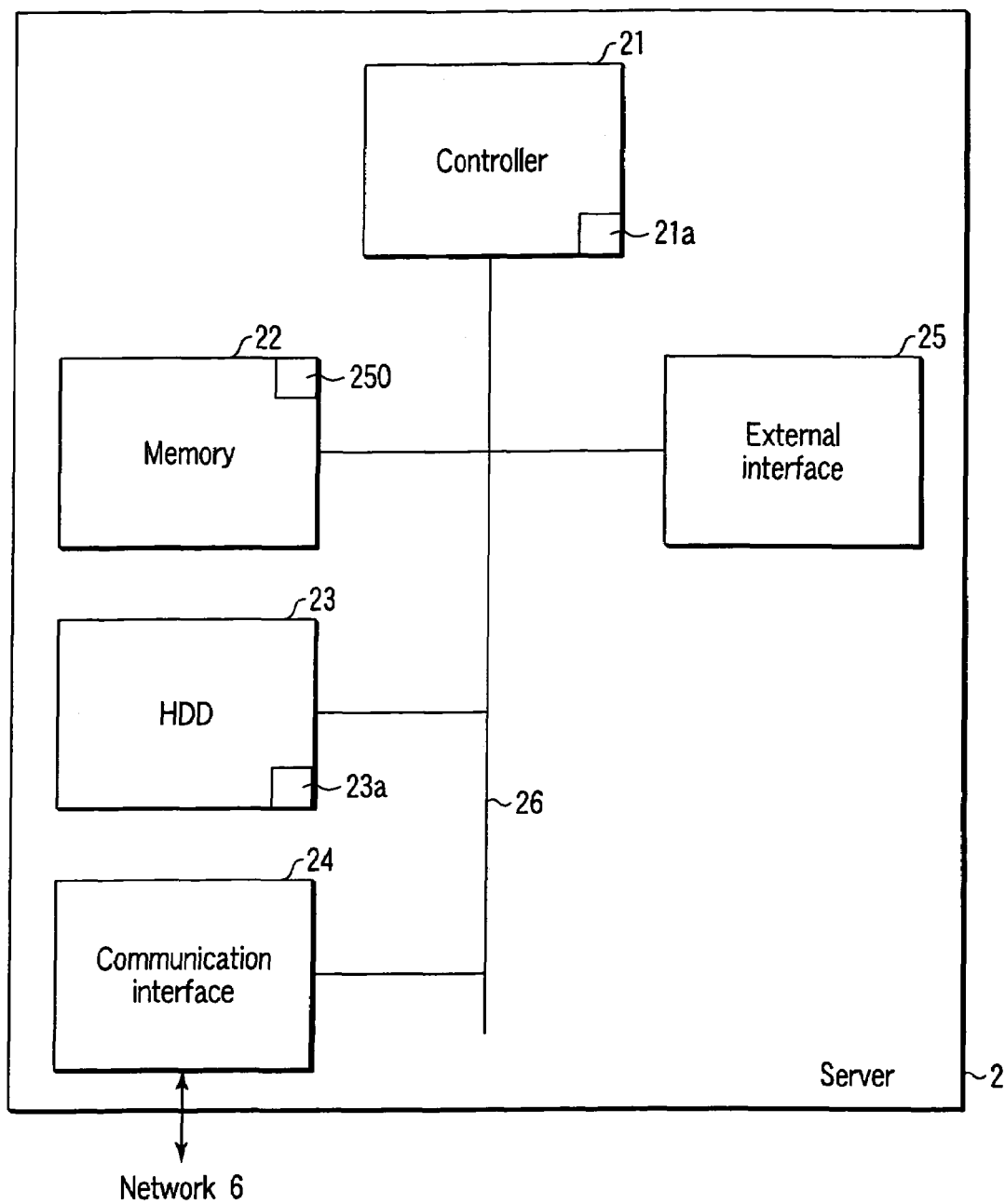
FIG. 3 is a schematic view of the constitution of the hardware of a server.

FIG. 3 schematically shows the hardware constitution of the server 2. As shown in FIG. 3, the server 2 is constituted by a controller 21, memory 22, hard disk drive (HDD) 23, communication interface 24, and outside interface 25.

These elements are connected through a bus 26.

The controller 21 is constituted by CPU, and controls the operation of whole server 2. The controller 21 has a timer 21a, about which detailed explanation is given later.

The memory 22 stores the data for the server 2 to carry out operation.

HDD 23 stores program and data, and the data to be printed by the MFP 3. HDD 23 is provided with a data base 23a in which the ID to be described in detail later is to be stored.

The communication interface 24 is an interface with the network 6. Data and the like are to be sent to and received by the network 6 through the communication interface 24. The outside interface 25 is an interface for the peripheral apparatuses such as display, keyboard, and mouse (not illustrated) to be connected to the server 2.

Next, explanation is given on a schematic constitution of hardware of MFP 3.

Figure 4:
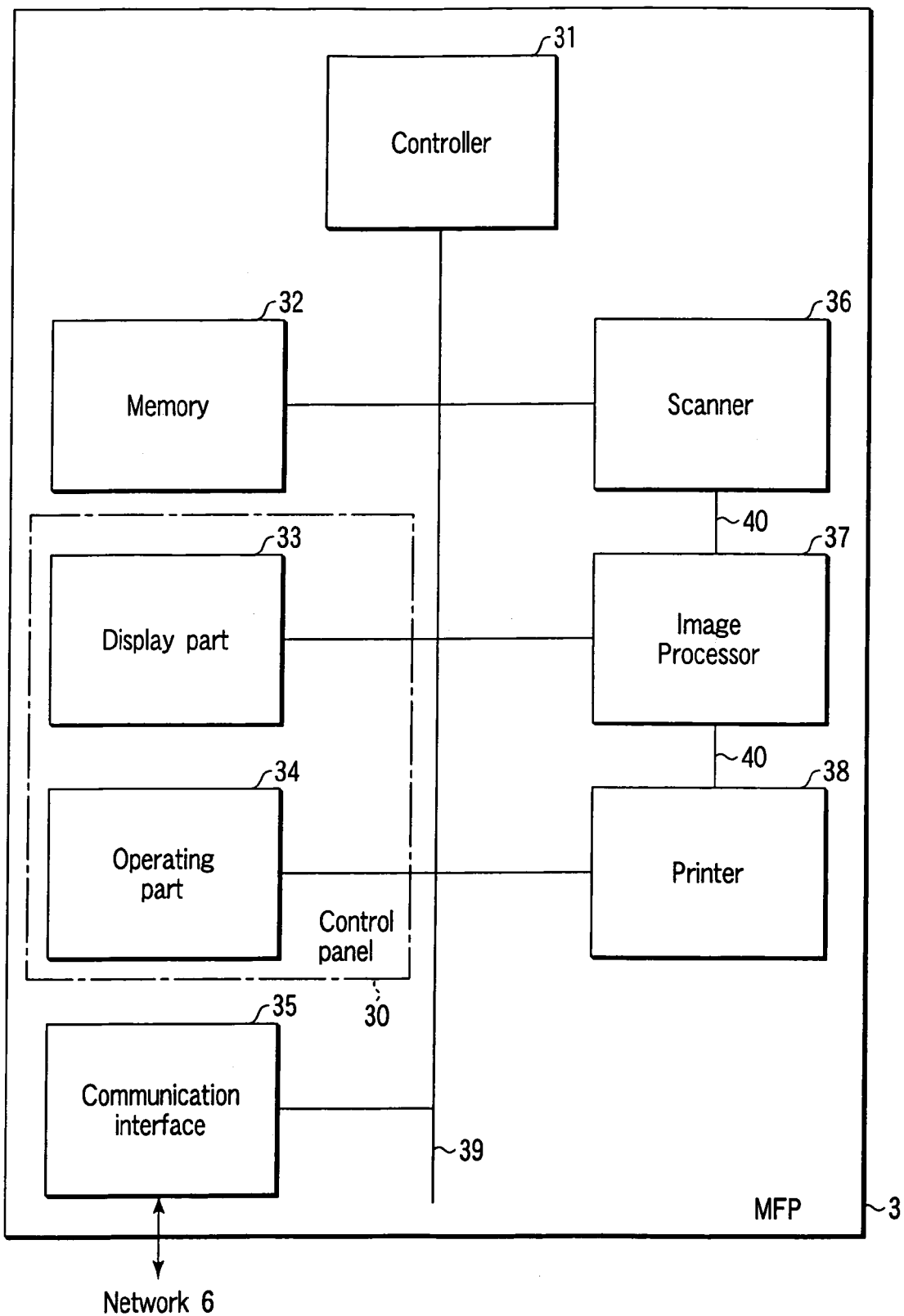
FIG. 4 is a schematic view of the constitution of the hardware of a digital compound machine (MFP)

FIG. 4 schematically shows the hardware constitution of MFP 3. As shown in FIG. 4, the MFP 3 is constituted by a controller 31, memory 32, display unit 33, operating unit 34, communication interface 35, scanner 36, image processing unit 37, and printer 38. The display unit 33 and the operating unit 34 constitute the control panel 30 of the MFP 3.

These controller 31, memory 32, display unit 33, operating unit 34, communication interface 35, scanner 36, image processing unit 37, and printer 38 are connected through the bus 39, and the data and the control signals are exchanged between them.

The scanner 36, image processing unit 37, and printer 38 are connected by the bus 40 for exclusive use for images. The bus 40 for exclusive use for images is a bus to be used exclusively for the image data. By separating the image data from ordinary bus 39, communication of high speed image data can be performed.

The controller 31 is constituted by the CPU, and carries out control of the operation of the MFP 3.

The memory 32 stores the data for MFP to carry out operation.

The display unit 33 is integrated with a liquid crystal panel and a touch panel, thereby displaying various kinds of information for operation and making it possible to perform input for operation.

The operating unit 34 is constituted by various hard keys including ten keys, and accepts input.

The communication interface 35 is an interface to the network 6. Data and the like are received from and sent to the network 6 through the communication interface 35.

The scanner 36 is a unit to scan the original data to prepare image data.

The image processing unit 37 performs processing of the image data from the scanner 36 and the image data for printing sent through the communication interface 35.

The printer 38 is a unit for printing the processed image data. This printer 38 carries out printing by the printing methods of electronic photograph system, ink jet system, etc.

Next, explanation is given on the schematic constitution of PDA 4 as a portable terminal.

Figure 5:
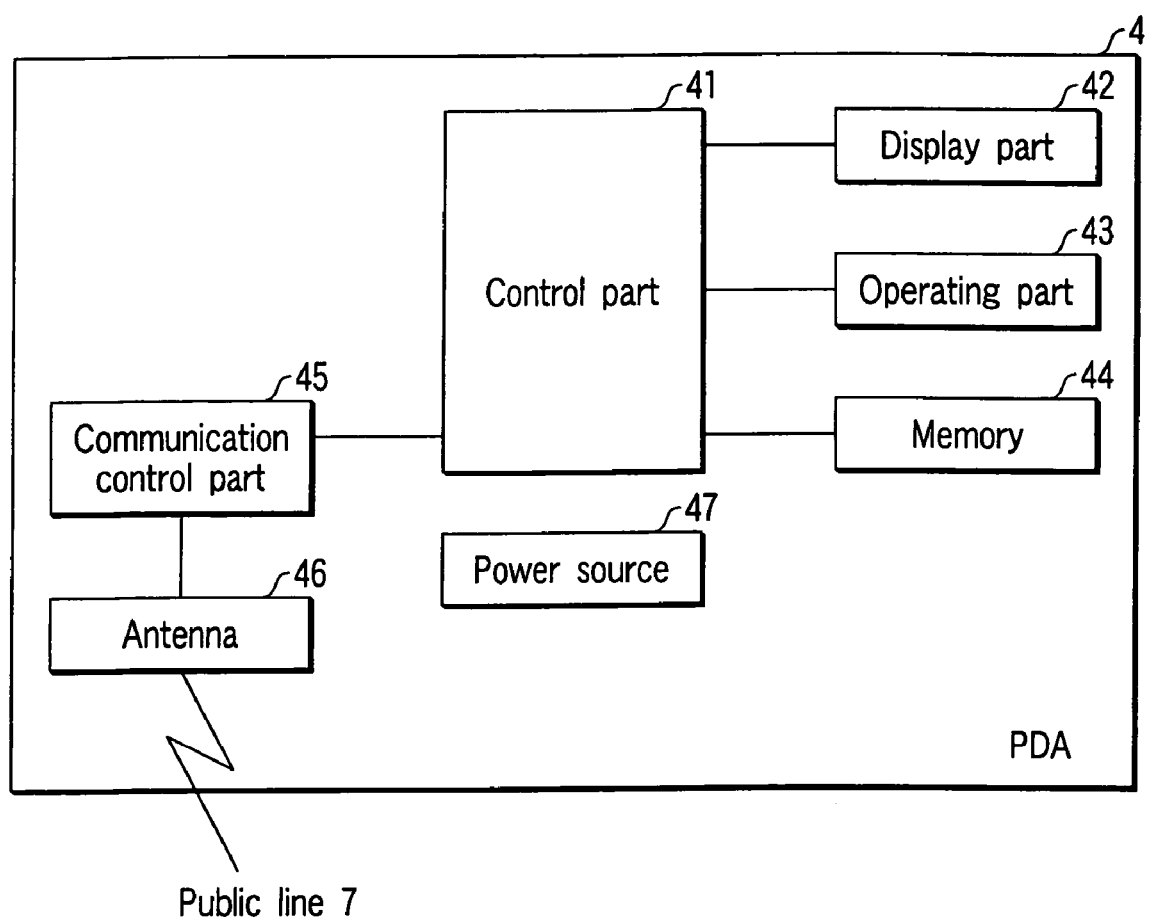
FIG. 5 is a schematic view of the constitution of the hardware of a PDA.

FIG. 5 schematically shows the constitution of the hardware of PDA 4. As shown in FIG. 5, this PDA 4 is constituted by a control unit 41, display unit 42, operating unit 43, memory 44, communication control unit 45, antenna 46, and power source 47.

The control unit 41 is constituted by CPU, and controls the whole PDA 4. The display unit 42 displays various data and input keys and the like by using a liquid crystal display unit. The operating unit 43 is constituted by various keys. The memory 44 stores the data and the like for the PDA 4 to carry out operation. The communication interface 45 is connected to the public line 7 through the antenna 46 to carry out sending and receiving data. The power source 47 supplies power to various parts.

Next, explanation is given on the schematic constitution of portable telephone unit 5 as a portable terminal.

Figure 6:
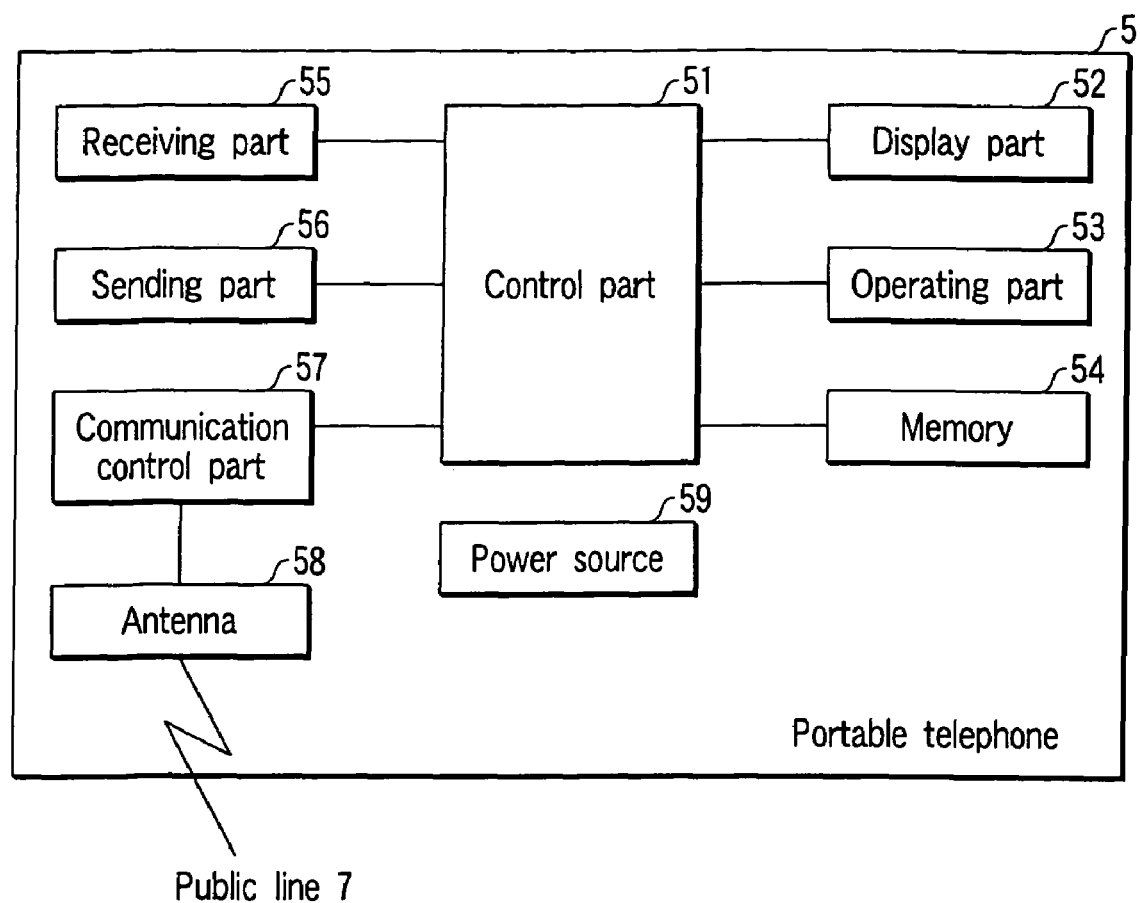
FIG. 6 is a schematic view of the constitution of the hardware of a portable telephone unit.

FIG. 6 schematically shows the constitution of the hardware of portable telephone unit 5. As shown in FIG. 6, this portable telephone unit 5 is constituted by a control unit 51, display unit 52, operating unit 53, memory 54, receiver unit 55, speaker unit 56, communication control unit 57, antenna 58, and power source 59.

The control unit 51 is constituted by CPU, and controls the whole portable telephone unit 5. The display unit 52 displays various data and input keys and the like by using a liquid crystal display unit. The operating unit 53 is constituted by various keys. The memory 54 stores the data and the like for the portable telephone unit to carry out operation. The receiver unit 55 is constituted by a speaker. The speaker unit 56 is constituted by a microphone. The communication control unit 57 is connected to the public line 7 through the antenna 58 to carry out telephone function or sending and receiving data. The power source 47 supplies power to various parts.

In this example, in case of the printing by PC1, the data is once stored in the server 2, and then transferred to MFP 3 for printing. In the same manner, in case of the printing from PDA 4 or portable telephone unit 5, the printing data is once stored in the server 2, and then transferred to MFP 3 for printing.

In other words, according to the printing system of this example, in case of carrying out printing from PC1, PDA 4 and portable telephone unit 5, the printing data which is transmitted as mail to the server 2 and temporarily stored in the server 2 is printed with MFP 3.

As described above, if connection with the network can be made with the apparatus with which mail may be handled, the printing system of this example becomes usable so as to have the printer on the network effect printing with ease.

Figure 7:
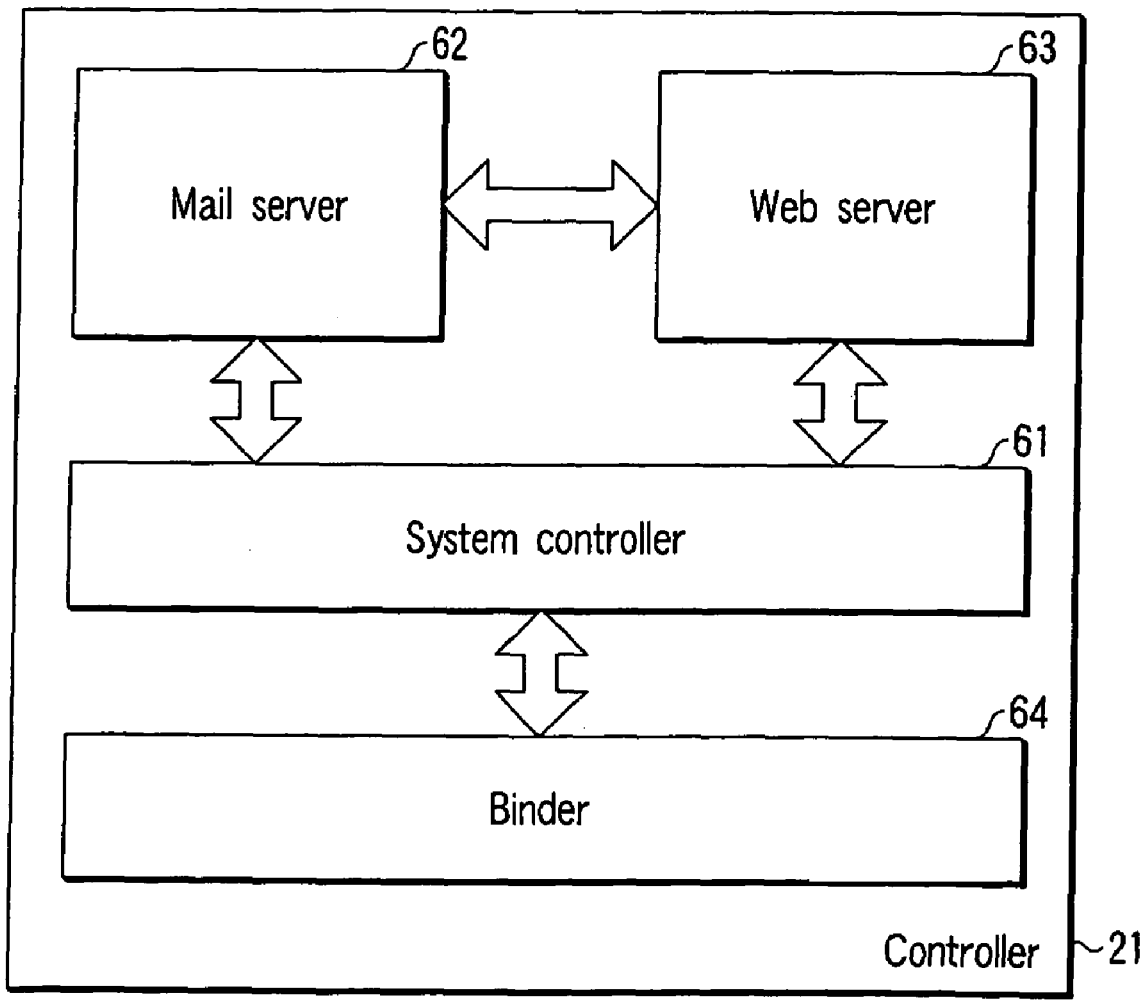
FIG. 7 is a view showing the schematic constitution of the function realized by the server.

FIG. 7 shows a schematic constitution of the function realized by the server 2. In FIG. 7, the functions to be realized by the controller 21 of the server 2 by software are logically and schematically shown. This controller 21 possesses the functions of the system controller 61, mail server 62, WEB server 63, and binder 64, and the like.

The system controller 61 includes an operating system (OS). This system controller 61 effects control of the mail server 62, WEB server 63, and binder 64. This system controller 61 performs exchange of data between the mail server 62, WEB server 63, and binder 64.

The mail server 62 is a system to carry out sending and receiving mail. This mail server 62 is controlled by the system controller 61. This mail server 62 performs exchange of data between the WEB server 63 and the binder 64 under the control of the system controller 61.

The WEB server 63 is a server for carrying out various services by WEB (world wide web). This WEB server 63 is controlled by the system controller 61. This WEB server 63 effects exchange of data between the mail server 62 and the binder 64 under the control of the system controller 61.

The binder 64 stores the data to be printed by MFP 3. This binder 64 is controlled by the system controller 61. This binder 64 This WEB server 63 effects exchange of data between the mail server 62 and the WEB server 63 under the control of the system controller 61. This binder 64 stores the data for printing with MFP 3 based on the printing instructions from PC1, PDA 4 and portable telephone unit 5.

It is also possible for the user to make input operation from the display 17 of MFP 3 and the keyboard 18 to read out the desired printing data stored in the binder 64 of the server 2 and effect printing with said MFP 3.

For this reason, in the binder 64 user control is effected. The user may keep security by the user ID and the password.

Furthermore, the user may set up a folder to facilitate control in storing the printing data in the binder 64, and store the printing data in the folder of own selection. In printing data with MFP 3, the user inputs the user ID and the password from the display 17 and the keyboard 18, and have access to the folder selected by said user. The user may select the printing data in said folder and effect printing with said MFP 3.

Figure 8:
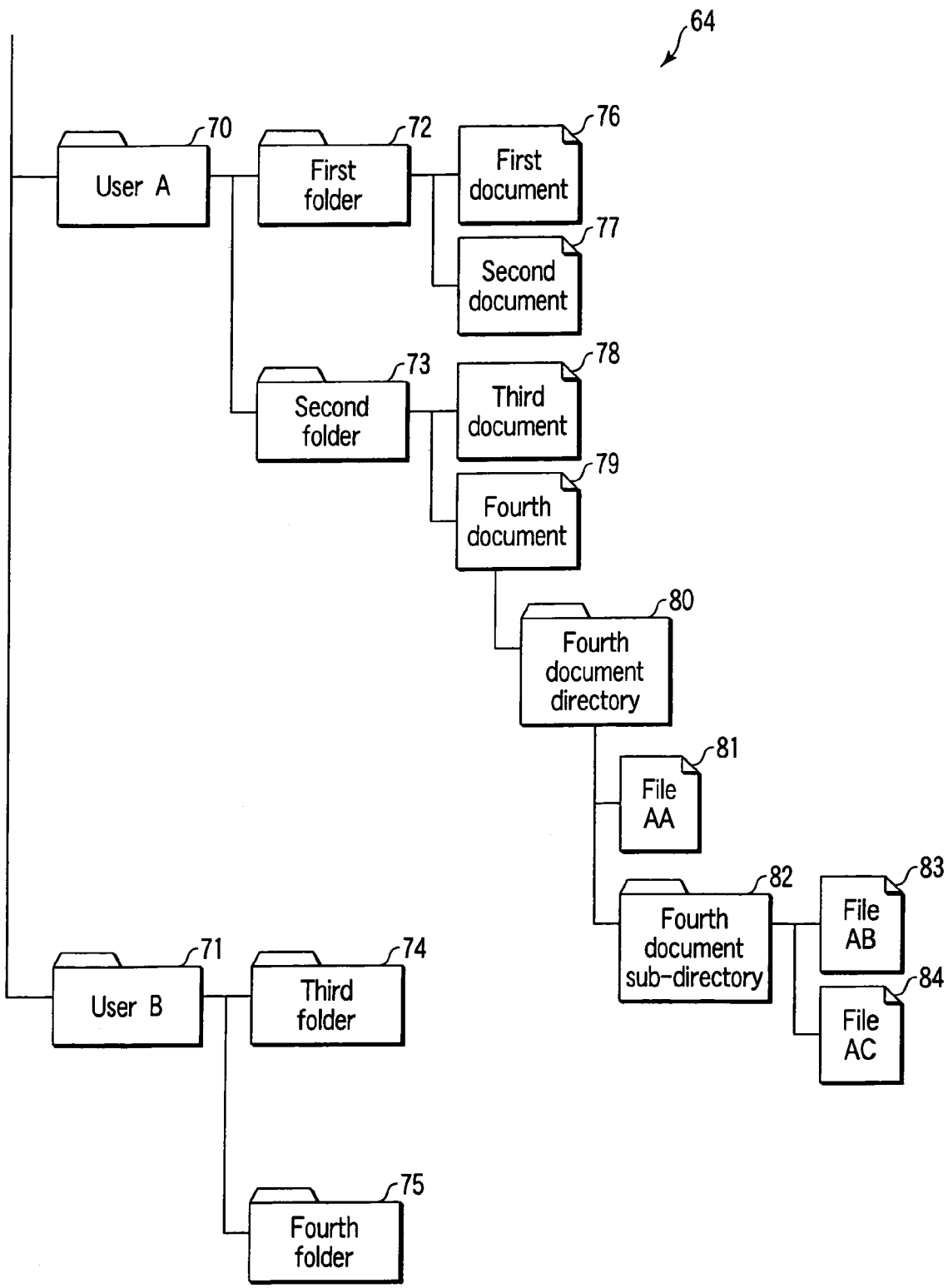
FIG. 8 is a conceptual view of a binder.

FIG. 8 shows a conceptual view of the above binder 64. The control structure of the data memorized in the binder 64 is analogous to the structure of the directory. Namely, as shown in FIG. 8, there are the columns of the user in the first stage, the folder in the second stage, and the printing data in the third stage. Further, the printing data may be constituted either by a single file or by a plurality of files. Further, in case the printing data are constituted by a plurality of files, the printing data become a directory structure. In case the printing data are constituted by a plurality of files, there is formed a directory constituted by a plurality of files under the printing data.

As an example of such printing data, there is a document of HTML style (HTML document). This HTML document may be constituted by a single file or by a plurality of files. In case the HTML document is constituted by a plurality of files, the HTML documents as printing data are controlled in directory structures on each data. The binder 64 is adapted to the formats of various printing data as above. By controlling data by such structure, the user has no choice of access else than to the data of own use. Consequently, the user cannot have access to or see other person's folder or printing data.

Next, using an example shown in FIG. 8, explanation is given on the constitution of control of the data in the binder 64.

In the binder 64, the user is controlled in the first stage. In the example shown in FIG. 8, the two users of user A70 and user B71 are controlled.

The user A70 has two folders of the first folder 72 and the second folder 73. The user 70 stores the two documents of the first document 76 and the second document 77 in the first folder 72. These first document 76 and the second document 77 may be themselves the files. Furthermore, the user A70 stores the two documents of the third document 78 and the fourth document 79 in the second folder 73.

In this example, the fourth document 79 is constituted by a plurality of files. Accordingly, the fourth document 79 is controlled by arranging a plurality of files in a plurality of directories. For this reason, the fourth document 79 has the fourth document sub-directory 82 under the fourth document directory 80. In other words, the directory 80 of the fourth document has one file (file AA) 81 and one sub-directory (fourth document sub-directory) 82. Furthermore, the above fourth document sub-directory 82 has under it two files (file AB83, file AC84). In this manner, the fourth document 79 is constituted by the fourth document directory 80, file AA81, fourth document sub-directory 81, file AB83, and file AC84.

Also, the user B71 has the third folder 74 and the fourth folder 75. The respective third folder 74 and fourth folder 75 are assumed to be vacant.

In case the control is made under such data constitution, for example, the user B71 cannot see the data of the user A70. As such, in the binder 64, each user cannot see other's data, but can make preparation and deletion of the folder for own use. Accordingly, each user can make registration and deletion of documents contained in the own folder.

Next, the action of storing documents in the folder for own use is explained in detail. Here, it is assumed that each user stores the own use data in a binder 64 by mail from PC1, PDA4 or portable telephone unit 5.

First, explanation is given on the address setting of mail in the case of the user storing a document in the binder 64 by means of mail from PC1.

Here, it is assumed that the user sets up at least the server (binder) name, user name, password and folder name as the address of the mail, in order to store document in the binder 64 as the document of own use. Provisionally, setting the user name as "mra", password as "password", folder as "box1", a document is stored in the binder 64 of the server 2. In case the setting is made as such, the user (mra) designates the user name, password and folder as the mail address. By this step, the user "mra" can store the data in the folder for own use in the binder 64.

Next, explanation is given on the example of setting the address of the mail for storing the user's data in the binder 64. Here, the information indicating the server 2 that has a binder 64 for storing data is set to be "serveraaa.com".

In this case, as the address of the mail, the following combinations are conceivable.

mra@box1.password.serveraaa.com or, mra@password.box1.serveraaa.com or, box1@mra.password.serveraaa.com or, box1@password.mra.serveraaa.com or, password@mra.box1.serveraaa.com or, password@box1.mra.serveraaa.com Alternatively, by selecting to use "subject" column, it may be possible to designate the three kinds of information (user, password and folder) mentioned above in one to three "subject" columns.

The examples to be set are shown below.

To=box1@password.serveraaa.com

Subject=mra or, To=password@box1.serveraaa.com

Subject=mra or, To=mra@password.serveraaa.com

Subject=box1 or, To=password@mra.serveraaa.com

Subject=box1 or, To=mra@box1.serveraaa.com

Subject=password or, To=box1@mra.serveraaa.com

Subject=password and the like.

Besides, by using the main text, one to three of the above-mentioned three elements of user, password and folder may be designated in the main text.

Three examples to be set are shown below.

To=mra@box1.serveraaa.com

Main text password=password or, To=mra@serveraaa.com

Subject=box1

Main text password=password or, To=mra@serveraaa.com

Subject=password

Main text folder=box1 and the like.

As described above, as to the method for setting the mail address, there exist a plurality of combinations of server name, user name, password, and folder name. Setting may be other than the address setting examples shown above. That is to say, the mail address may be optionally set, provided that the information to show server name, user name, password, and folder name is included.

Next, the operation of storing the fourth document 79 shown in FIG. 8 in the binder 64 is explained. It is assumed that the fourth document is, for example, an HTML file named "main.html". In this case, it is assumed that the HTML file named "main.html" has the file AA81 "sub.html" and two image files (file AB83 "image1.jpg" and file AC84 "image2.jpg"). In other words, "main.html" as the fourth document 79 has "sub.html", "image1.jpg" and "image2.jpg". Although in this example explanation is given on an example of document, any other style of document may be usable.

Figure 9:
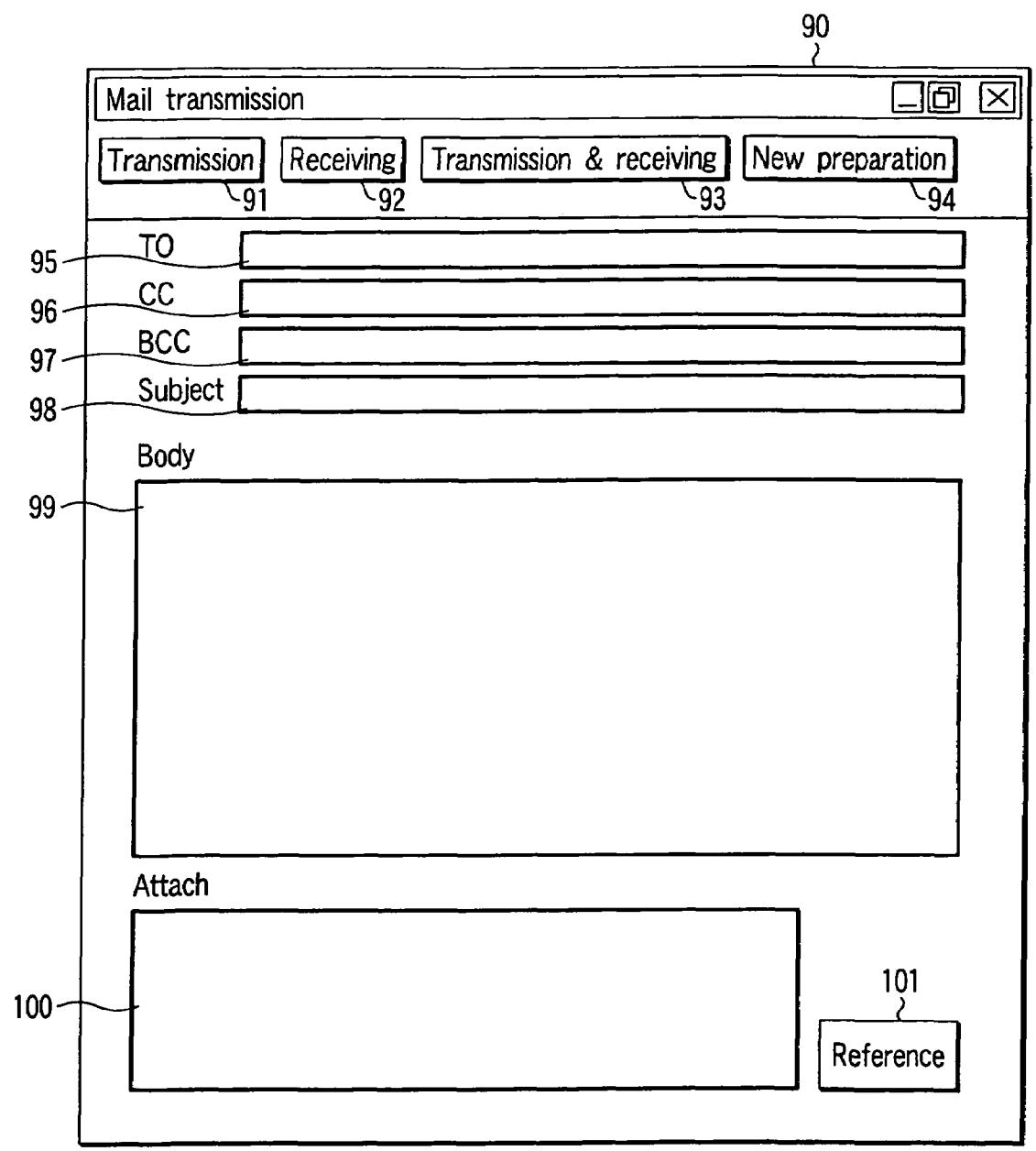
FIG. 9 is a view showing an example of display of a mail transmission image.
Figure 10:
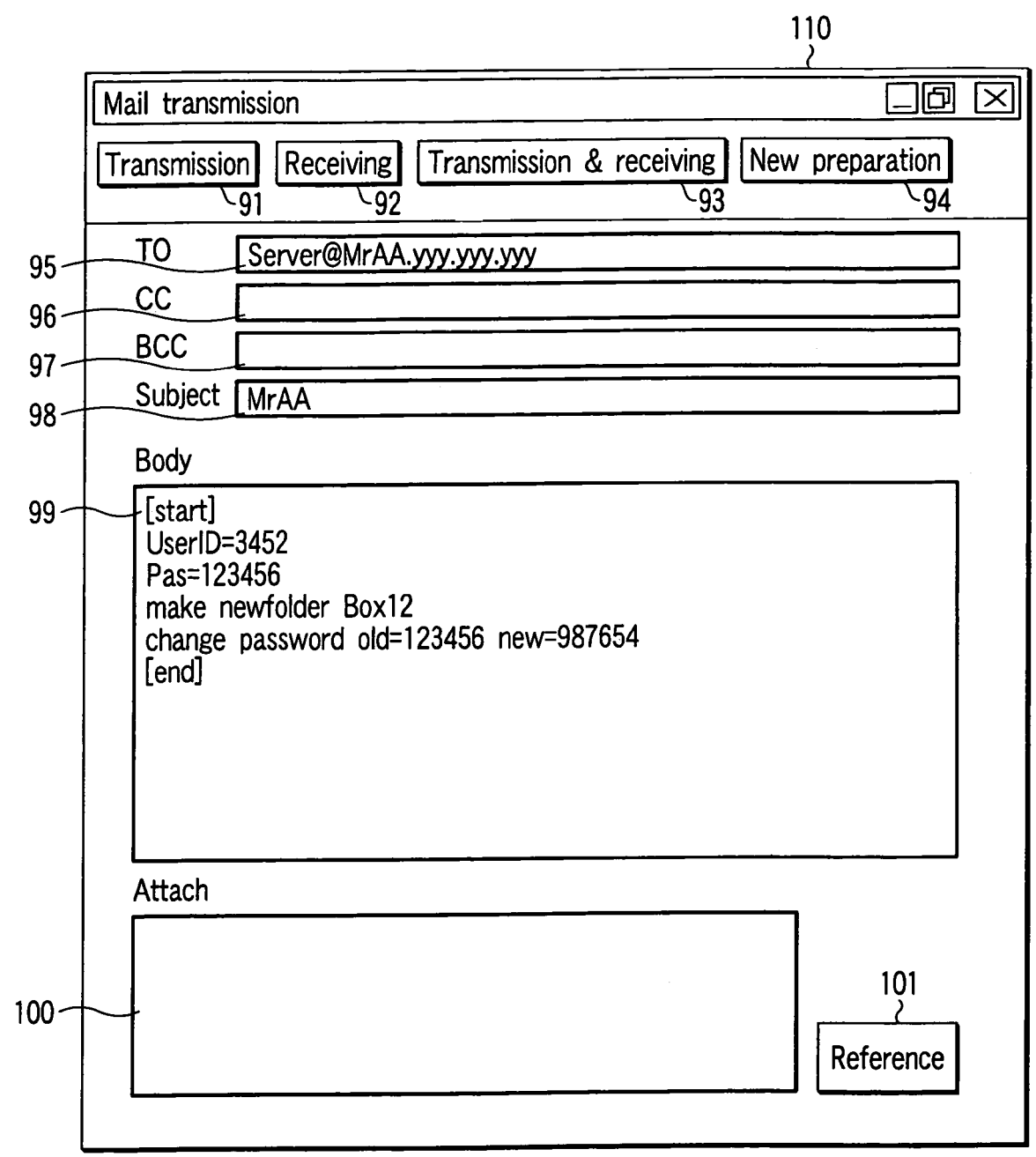
FIG. 10 is a view showing an example of display of a mail transmission image.

FIG. 9 and FIG. 10 show an example of display of the mail transmission screen in case of transmitting mail from PC1.

The mail transmission screen in FIG. 9 is the window 90 that is displayed on the display 17 at the start of the program for transmitting the mail with PC1 by the user. This window 90 is constituted by the "transmission" button 91, "receiving" button 92, "transmission and receiving" button 93, "new preparation" button 94, address column 95, same information column 96, blind enclosure column 97, subject column 98, main text column 99, attached file column 100, and reference button 101.

"Transmission" button 91 is a button to instruct the mail transmission. When this transmission button 91 is clicked, the PC1 controller 11 transmits the mail.

"Receiving" button 92 is a button to instruct the mail receiving. When this receiving button 92 is clicked, the PC1 controller 11 carries out mail transmission.

"Transmission and receiving" button 93 is a button to instruct the mail transmission processing and receiving processing. When this "Transmission and receiving" button 93 is clicked, the PC1 controller 11 carries out transmission of the prepared mail, and further receiving processing of mail.

"New preparation" button 93 is a button to instruct new preparation of mail. When this "New preparation" button 94 is clicked, the PC1 controller 11 displays, separately from the window already displayed on the display unit 17, a new window for mail preparation for the purpose of newly transmitting mail, on the display 17.

In the address column 95, an address of the mail is inputted. In this address column 94, a plurality of addresses may be inputted by sectioning with commas.

In the same information column 96, addresses for sending the same contents of mail are inputted. In this same information column 96, a plurality of addresses may be inputted by sectioning with commas.

In the blind enclosure column 97, the addresses for enclosing the mail in blind manner are inputted. In this blind enclosure column 97, a plurality of addresses may be inputted by sectioning with commas.

In the subject column 98, the subject of mail is inputted.

In the main text column 99, the main text of mail is inputted.

In the attached file column 100, the document to be attached to the mail is displayed. To this attached file column 100, the document to be attached to the mail is displayed. In this attached file column 100, a plurality of documents are indicated in case of attaching a plurality of documents to the mail.

The reference button 101 is a button is a button to permit easy selection of the file in designating the files to be inputted in the attached file column 100. When this reference button 101 is clicked, directories in the memory devices such as HDD13 held by PC1 are caused to be displayed to make the file selection possible. When this reference button 101 is clicked and the file is selected from the displayed directory, the controller 11 of PC1 displays the selected file in the attached file column 100.

The user inputs the necessary items out of the above-mentioned items, and clicks "Transmission" button 91. By this, the mail is transmitted.

Further, in case the mail covers a large volume of data, the controller 11 of PC1 divides the mail set by the user into a plurality of mails and transmits them to the addresses. This is in order to take steps against the case of the small capacity of the network of the server 2 to pass through in the halfway. This becomes possible by making setting for division into every 32 kilobytes, every 64 kilobytes, every 128 kilobytes, etc. For such file attachment, character designation, and division, MIME and the like are used. In this manner, the document to be stored is sent from PC1 to the server 2 as an attached file 1. By this, the server 2 receives the mail from PC1, analyzes the contents of the received mail, and stores the mail in the binder 64.

Next, explanation is given on the operation to cause registration from PC1 to the server 2 by transmitting the mail. In this case, operation can be made by describing simple script in the main text. As example for this procedure, examples of new preparation of folder and alteration of password are shown in FIG. 10. In FIG. 10, same marks are assigned to the same places as those of FIG. 9 and explanations on them are omitted. The points of differences of FIG. 10 from FIG. 9 are that the data are entered in the address column 95, subject column 98, and main text column 99, respectively.

In the address column 95, an address of the server "Server@MrAA.yyy.yyy.yyy" is entered.

In the subject column 98, the subject "MrAA" is entered.

In the main text column 99, a script that provides new preparation of folder and alteration of password is entered. Brief description is given on this script. "[start]" on the first line instructs the server that this main text is the script and it starts. "UserID=3452" on the second line shows the ID of the user concerned. "Pas=123456" on the third line shows that the password of this user is "123456". "Make newfolder Box12" on the fourth line instructs this user to prepare newly a folder "Box12". "change password old=123456 new=987654" instructs this user to alter password, and in this example shows to change from "123456" to "987654". "[end]" on the sixth line means that this main text is a script, and said script is to terminate.

Up to this part, explanation has been given on the case where the document is stored from PC1 by using mail. In this example, transmission is made by entering a folder, user ID, and password in the mail.

A further example is explained.

At first, the user has access to the server 2 by using Web to have Web page displayed. Here, the user ID, password, and folder are selected. And, the server 2 stores them in the storage region, and transmits mail to the user of PC1. The user receives with PC1 the mail from the server 2, and sends a reply to said mail, with simultaneous attachment of the document to be stored. In this example, a coded algorithm is entered in the Web browser to obtain improved security. And, this is easy because it suffices with sending reply to the incoming mail and attaching to said mail. In this example, it is possible to improve security and to carry out operation with ease.

Next, an example of operation using this Web browser is explained.

Figure 11:
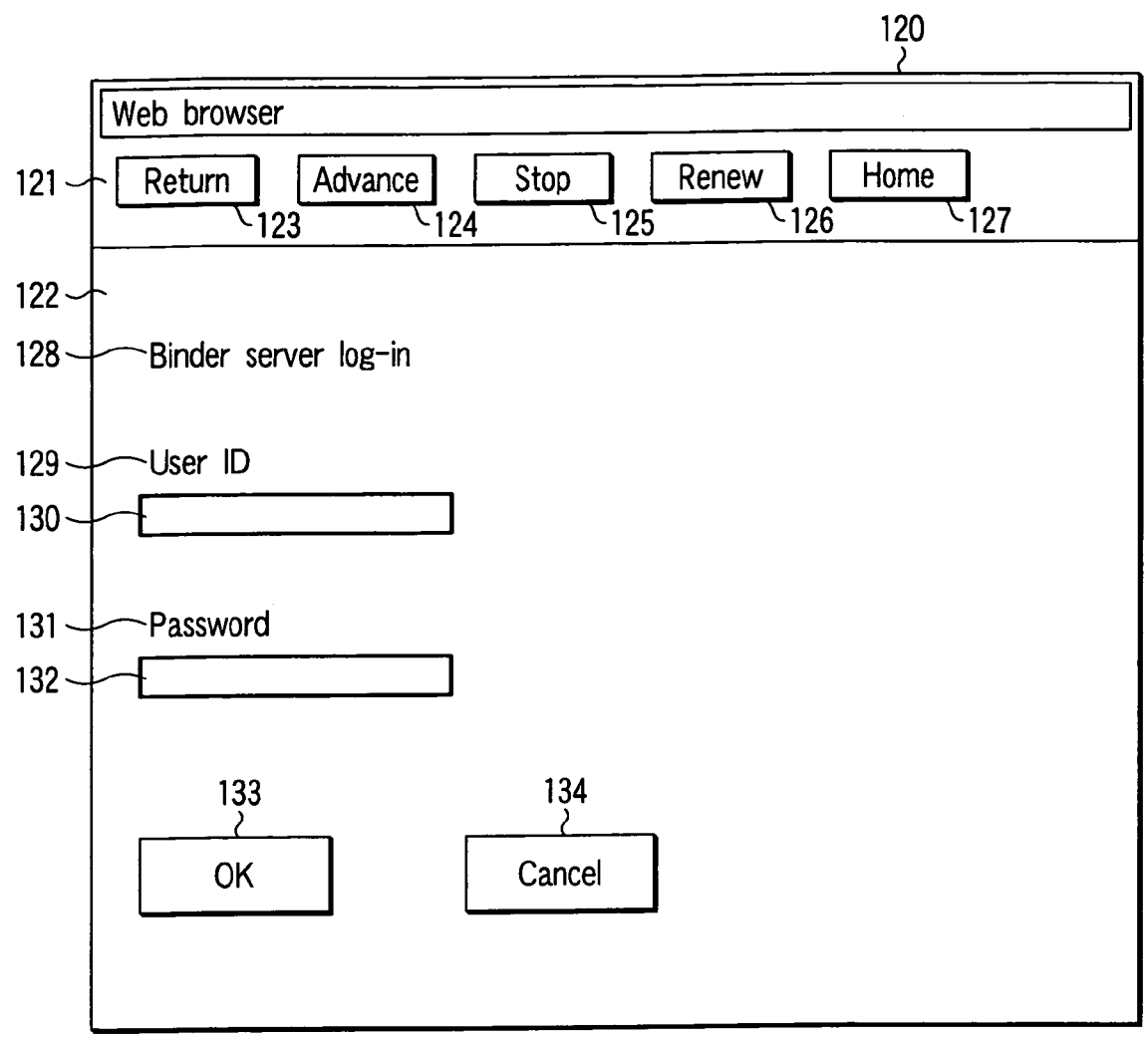
FIG. 11 is a view showing an example of image of Web browser.

FIG. 11 shows an example of screen of the Web browser to be displayed on the display 17 of PC1 through access to the Web server from PC1. In FIG. 11, a window 120 of Web browser screen is shown. This window 120 comprises a Web browser button display region 121 and a Web page display region 122.

The Web browser button display region 121 is one inherent to this browser, having disposition of a button to control the operation of the Web browser. The Web page display region 122 is a region to display Web page sent from the server 2.

The Web browser button display region 121 is constituted by the "return" button 123, "advance" button 124, "stop" button 125, "renewal" button 126, and "home" button 127. On clicking the "return" button 123, the Web page that had been displayed a step before is displayed. On clicking the "advance" button 124, in case of returning by "return" button, the Web page before returning is displayed. When the "stop" button 125 is clicked, reading of the page is stopped. When the "renewal" button 126 is clicked, the displayed Web page is renewed. When the "home" button is clicked, the preset Web page is displayed.

Also, in the Web page display region 122, the Web page sent from the server 2 is displayed. When access is made first to the server 2, a log-in screen to the server 2 as shown in FIG. 11 is displayed. Because of this, there is first displayed a title "binder server log-in" 128 in the Web page display region 122. That is to say, this page is constituted by the title display region 128, user ID character display region 129, user ID input column 130, password character display region 131, password input column 132, "OK" button 133, and "cancel" button 134.

The title display region 128 is displayed here as "binder server log-in". In the user ID character display region 129, the characters "user ID" are displayed. The user ID input column 130 is a column for inputting the user ID. In the password character display region 131, the characters "password" are displayed. The password input column 132 is a column in which the password is to be inputted. However, when a password is inputted, an asterisk "*" is displayed so as to keep the contents off from others.

The "OK" button is clicked after completion of input of the user ID and password. By so doing, when the user ID and the password coincide, the step goes to the next screen. When the "cancel" button 134 is clicked, the user ID and the password so far inputted are cleared.

Figure 12:
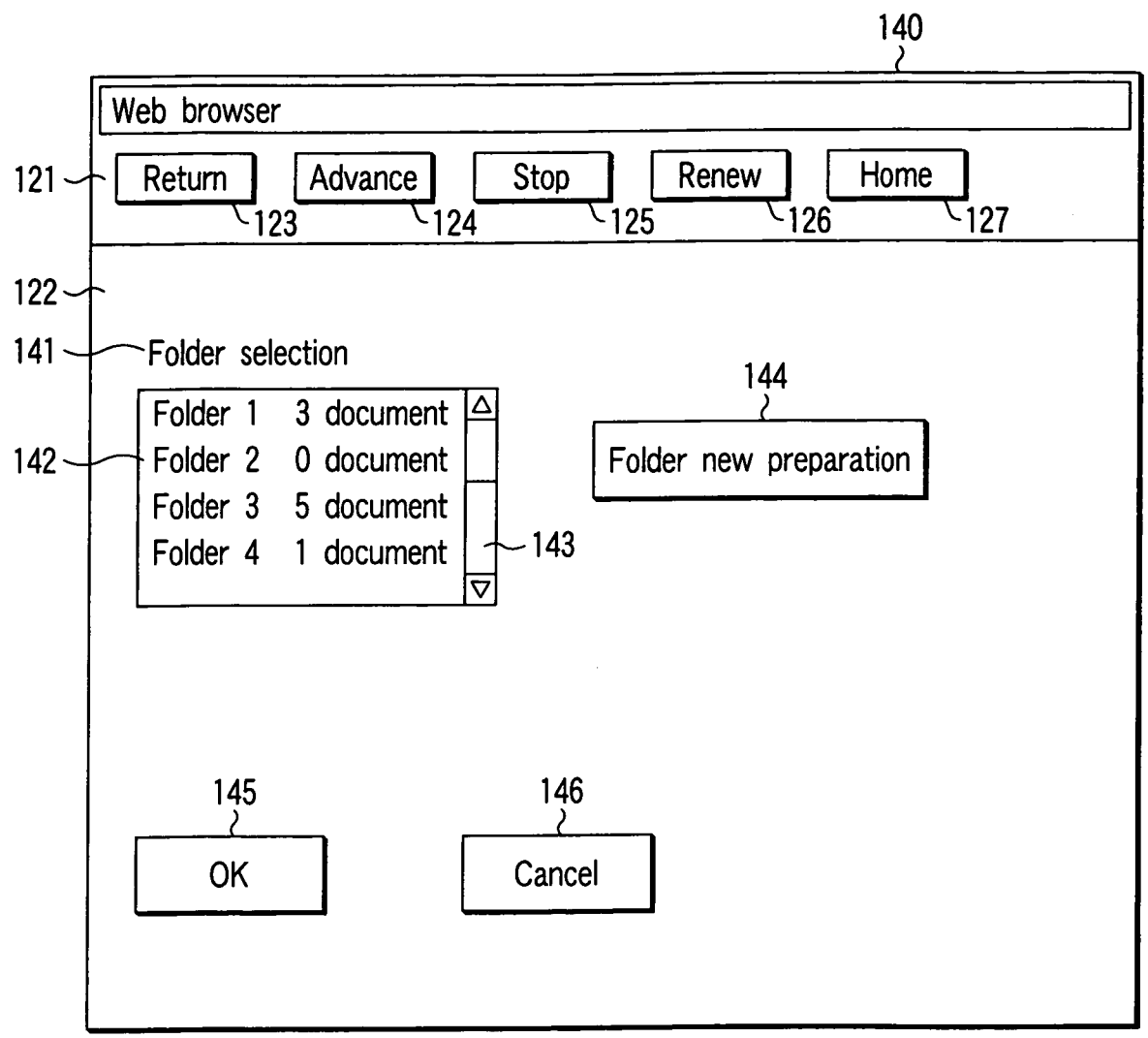
FIG. 12 is a view showing an example of image displayed in the case where the inputted user ID and password are genuine.

FIG. 12 is a screen to be displayed in the case where the inputted user ID and password are correct. In the window 140 having this screen, the user selects the folder which he desires to store. This window 140 comprises the Web browser button display region 121 and the Web page display region, in the same manner as the window 120 of FIG. 11.

The Web browser button display region 121 has the same constitution as that of FIG. 11, so that the explanation is omitted.

Explanation is given on the Web page display region. This Web page is constituted by the title region 141 indicated as "selection of folder", folder selection region 142, folder new preparation button 144, "OK" button 145, and "cancel" button 146. Further, the folder selection region 142 has a scroll bar 143 for the case where, due to the existence of the plural numbers of folders, display cannot be made in the display screen.

In the title region 141, display is made as "selection of folder" which is the present operation. In the folder selection region 142, the folder name and the number of the documents contained in said folder are displayed. When the folder name is clicked, inverse display is made to provide a selected state.

When the folder new preparation button 144 is clicked, another window is opened to make ready for the folder name to be inputted. In this connection, the folder of the inputted name is prepared. And, the folder prepared here is also displayed in the folder selection region 142.

When, after the folder is selected, the "OK" button 145 is clicked, a mail for storing a document in the selected folder is transmitted to the predetermined address. When the "cancel" button 146 is clicked, the selected folder is canceled to provide a screen shown in FIG. 11, being a screen which precedes one step.

Figure 13:
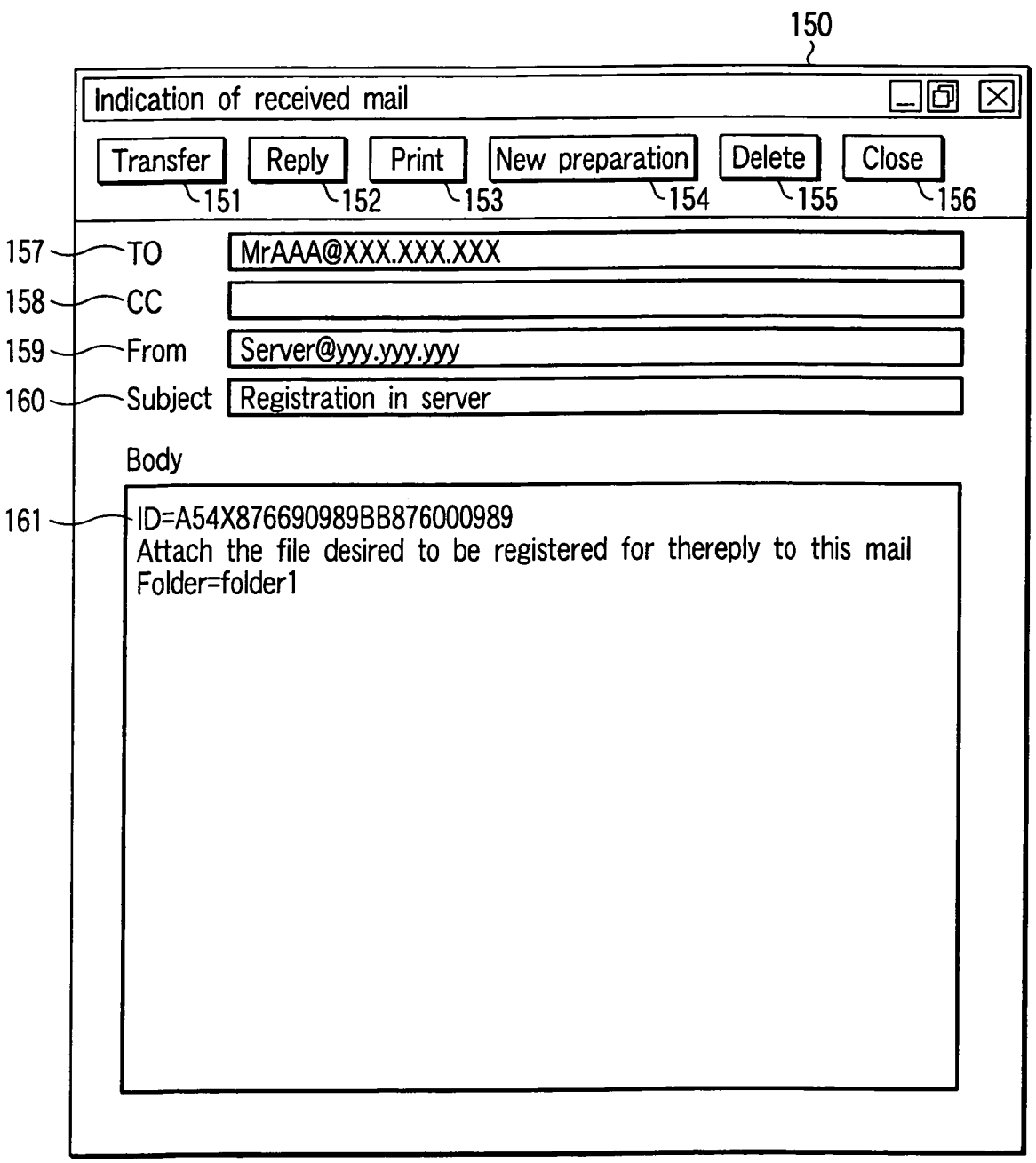
FIG. 13 is a view showing the images shown in a display.

FIG. 13 shows a screen displayed on the display 16 at the time when the mail set in Web is received by PC1. In FIG. 13 there is shown the state where the mail for registration sent from the server 2 has been received.

The received mail window 140 is constituted by the "transfer" button 151, "reply" button 152, "print" button 153, "new preparation" button 154, "delete" button 155, "close" button 156, address column 157, same information column 158, sender column 159, subject column 160, and main text column 161.

When the "transfer" button 151 is clicked, this mail can be transferred to others. When "reply" button 152 is clicked, a reply to this mail can be sent to the sender. When "print" button 153 is clicked, it becomes possible to print this mail with a printer. When "new preparation" button 154 is clicked, a window for newly transmitting mail is opened without respect to said mail, thereby making it possible to send mail.

When the "delete" button 155 is clicked, this mail is deleted. When "close" button 156 is clicked, the window 150 is closed. In the address column 157, the addresses of the persons to receive the mail are shown. In this example, the address is "MrAAA@XXX.XXX.XXX". In the same information column 158, addresses of those who receive the same contents of mail are to be entered. In this example the column is vacant to show that there is no other person to receive the mail.

In the sender column 159, the address of the sender of this mail is entered. In this example, the indication is to show the server, "Server@yyy.yyy.yyy". In the subject column 160, the subject which is the title of this mail is entered. In this example, it is "registration in the server". In the main text column 161, the main text of this mail is written. In this example, there is described the ID of this mail in the first line, an announcement "attach the file desired to be stored for sending reply to this mail" in the second line, and the name of the folder to be stored in the third line. In this example, the mail is replied, and the document to be stored in the reply mail is attached. Accordingly, the user is to click the "reply" button 152.

Figure 14:
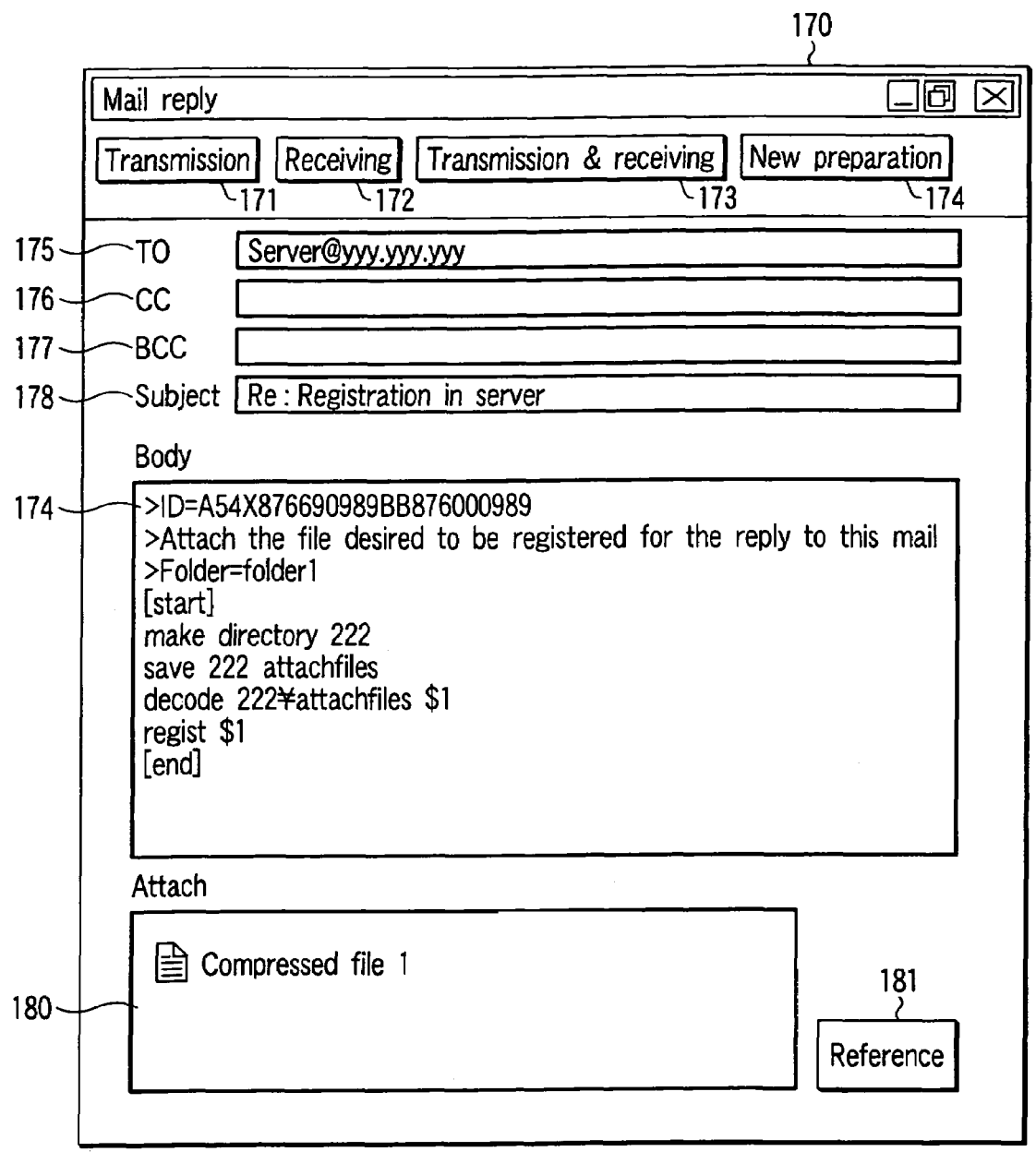
FIG. 14 is a view showing an example of the window at the time of sending reply to the mail.

FIG. 14 shows an example of window at the time of sending reply to the mail. In FIG. 14 the window 170 for sending reply to the mail is shown. This window 170 is constituted by the "transmission" button 171, "receiving" button 172, "transmission and receiving" button 173, "new preparation" button 173, address column 175, same information column 176, blind same information column 177, subject column 178, main text column 179, attached file column 180, and reference button 181.

The "transmission" button 171 is to be used for transmitting this mail by clicking. The "receiving" button 172 is to cause the PC1 to receive mail on clicking. The "transmission and receiving" button 173 is operated to cause the PC1 to transmit the prepared mail and receive mail on clicking. The "new preparation" button 174 is to cause a mail preparation window for newly transmitting mail open, independently from this window.

In the address column 175, the address of this mail is entered. In this example, the address column 175 is "Server@yyy.yyy.yyy". In the same information column 176, the addresses to which the same information mail are to be sent are entered. In this example the column is vacant to show that there is no other person to receive the mail. In the blind same information column 177, the addresses to which the same blind information mail are to be sent are entered. In this example the column is vacant to show that there is no person to receive the blind same information mail. In the subject column 178, the subject of this mail is entered. In this example, this part is "RE: registration in server".

In the main text column 179, the main text of the mail is entered. In the portion ranging from the first line to the third line of the main text, the incoming mail is marked with ">" and the same contents are shown. The fourth line of the main text is "start", in which script is described. It shows the beginning of the script.

The fifth line is "make directory 222", which instructs to prepare a new directory with the title of the directory 222 in this folder. The sixth line shows "save 222 attachfiles", designating to store the attached file in the directory 222. The seventh line of the main text shows "decode 222 attachfiles $1", instructing to thaw the stored file. Here, "$1" is a mark to denote the thawed file.

The eighth line of the main text shows "regist $1", designating to store the thawed file. The ninth line of the main text shows "end", denoting that the script has terminated.

In the attached file column 180, the document to be attached to this mail is displayed. In this example, it is shown that one "compressed file 1" is attached. The reference button 181 may be clicked in selecting the file to be contained in the attached file column 180 so as to have the directory in the PC1 displayed to facilitate the selection of the file.

By the clicking of the reference button 181, the file selected from the displayed directory is displayed in the attached file column 180. And, after completion of input of the necessary items, the transmission button 171 is clicked to transmit the mail. In this example, a script is described in the main text, but in case of attaching the stored document only as an attached file without describing the script in the main text, the attached document is naturally stored.

Next, explanation is given on the operation of MFP 3 shown in FIG. 1.

After storing in the server 2 the document to be printed from PC1 or the like, the user moves to the spot in front of MFP 3 to have access to the server 2 from the control panel 30 of said MFP 3 to call out the stored document and effect printing.

Figure 15:
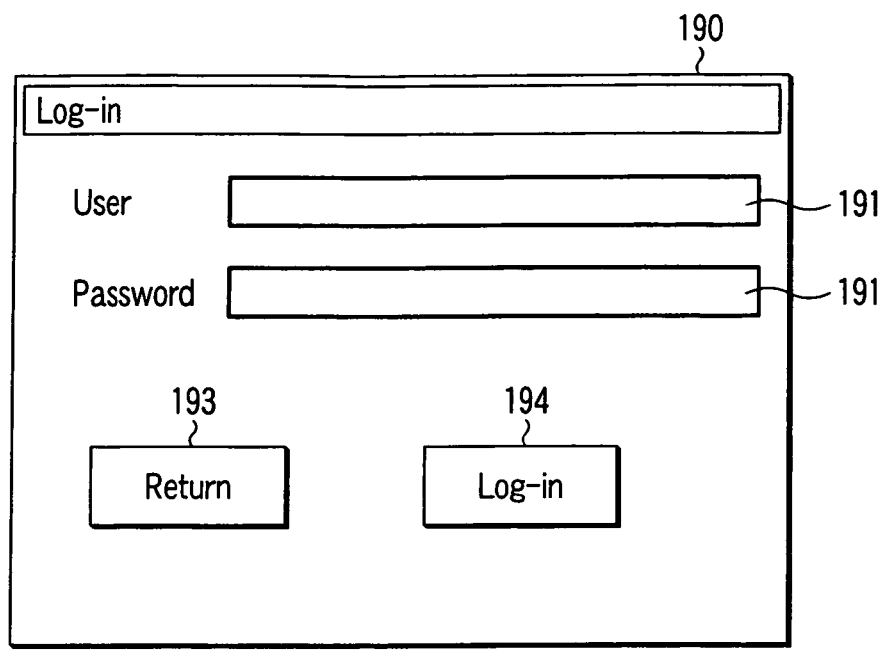
FIG. 15 is a view showing an example of the log-in image.

FIG. 15 shows an example of the log-in screen of the display section 33 in the control panel 30 of said MFP 3.

In the display section 33, at first there is displayed a log-in screen 190 as shown in FIG. 15. This log-in screen 190 is constituted by the user ID input column 191, password input column 192, "return" button 193, and "log-in" button 194.

In the user ID input column 191, a user ID is inputted from the ten key of the operating section 34. In the password input column 192, a password is inputted from the ten key of the operating section 34. The values inputted at this time are indicated by the asterisks "*" so as to keep the contents off from others.

When the "return" button is touched, the user ID and password are cleared.

Under the state where the user ID and password are inputted, the "log-in" button 194 is touched. Then, in case the user I and the password are correct, the step goes to the next screen.

The next screen is a folder selection screen.

Figure 16:
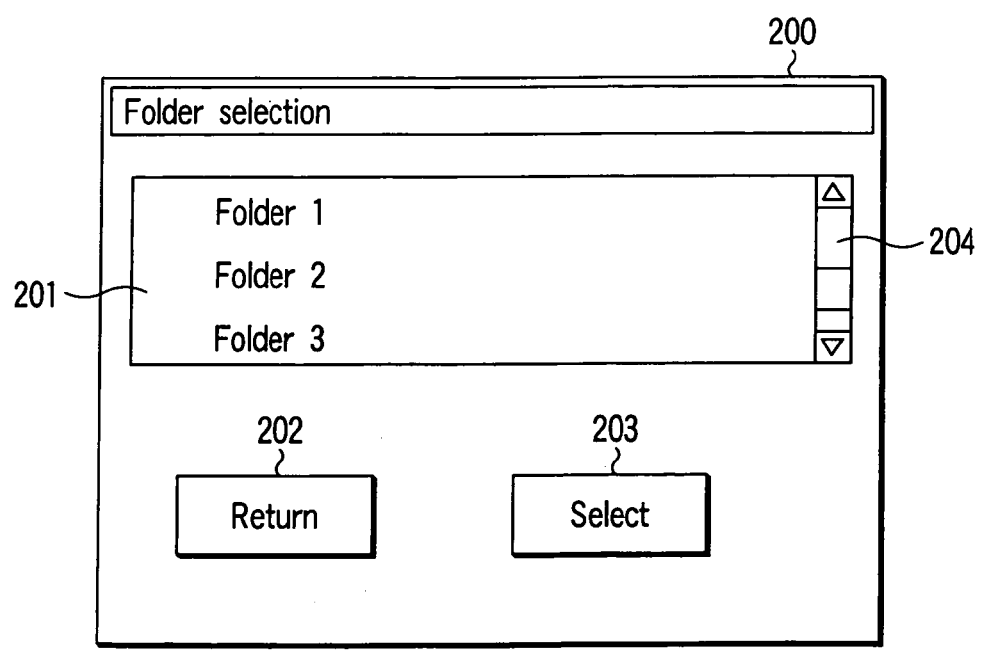
FIG. 16 is a view showing a folder selection image.

FIG. 16 shows the folder selection screen 200. This folder selection screen 200 is constituted by the folder selection column 201, "return" button 202, and "selection" button 203. The folder selection column 201 has a scroll bar 204 for instructing scroll in case there are plural folders which cannot be displayed in a display screen.

When the folder name of the folder selection column 201 is touched, the said folder is displayed inversely. The folder in inverse display is selected. When the "return" button 202 is touched, the selected folder is cleared to return to the log-in screen 190 of FIG. 15.

Further, when the "selection" button 203 is touched under the condition of the folder being selected, the step goes to the next screen.

The next screen is an screen of document selection.

Figure 17:
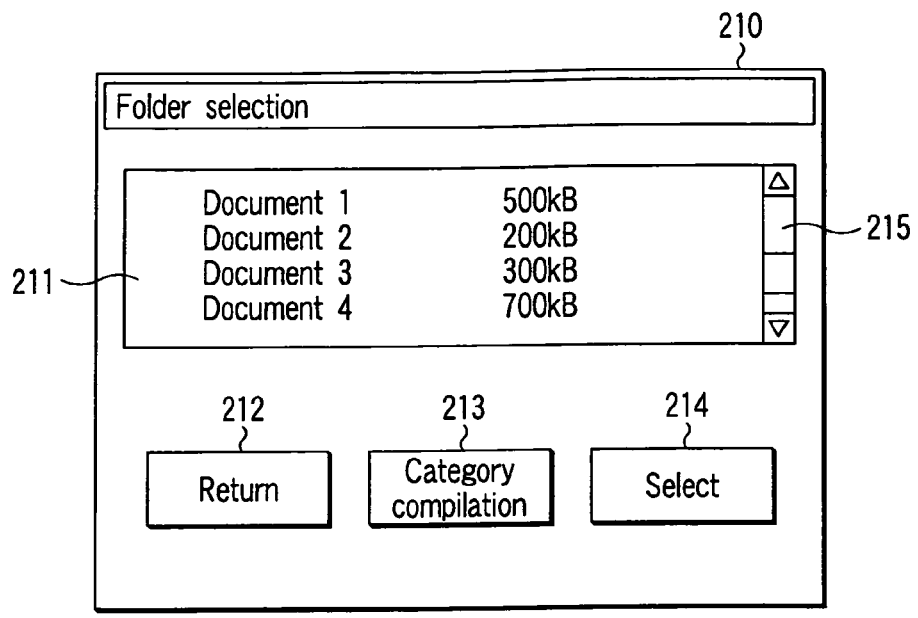
FIG. 17 is a view showing the document selection image.

FIG. 17 shows a document selection screen 210. This document selection screen 210 is constituted by the document selection column 211, "return" button 212, "category compilation" button 213, and "selection" button 214. The document selection column 211 has a scroll bar 215 for instructing scroll in case there are plural documents which are beyond display.

Besides, in the document selection screen 210 the total capacity of said document is displayed. When the document name in the document selection column 211 is touched, the document name concerned is displayed by inversion. This inversely displayed document is selected. When the "return" button 212 is touched, the selected folder is cleared, and the step returns to the folder selection screen 200. When the "category compilation" button 213 is touched under the condition where the document is selected, the step shifts to the screen of altering the category of said document. At the touch of the "selection" button 214 under the condition where the document is selected, the said document is printed.

Also, at the touch of the "category compilation" button 213, the document category alteration screen is displayed.

Figure 18:
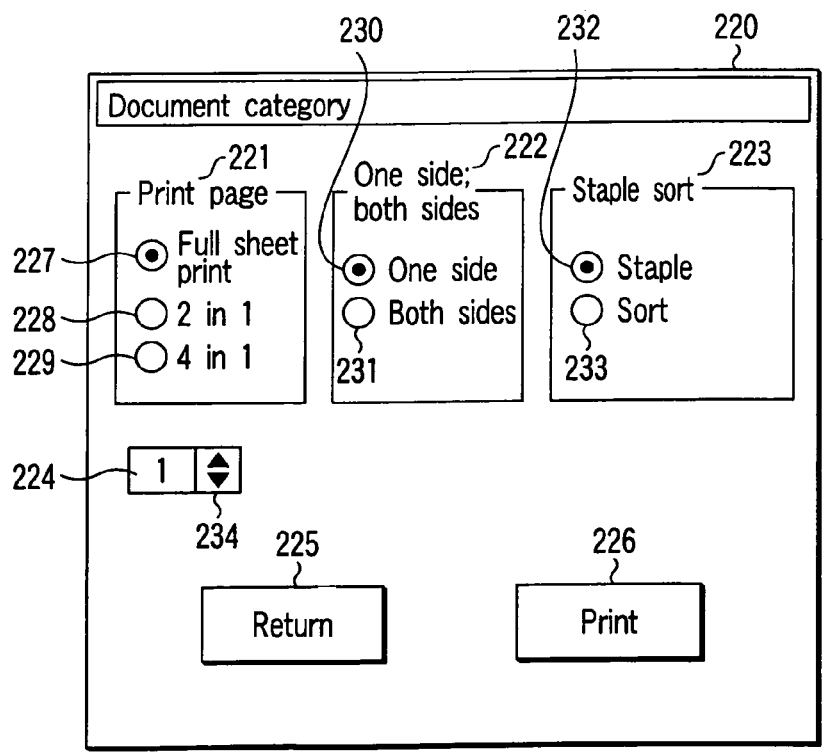
FIG. 18 is a view showing the document category change image.

FIG. 18 shows a document category alteration screen 220. This document category alteration screen 220 is constituted by the print page setting region 221, single face and double face setting region 222, staple and sort setting region 223, print number of copies setting region 224, "return" button 225, and "print" button 226.

The print page setting region 221 sets the number of pages of the screens to be printed in a sheet of paper. Accordingly, the print page setting region 221 is constituted by the full sheet print instructions 227, 2 in 1 instructions 228, and 4 in 1 instructions 229. When the full sheet print instructions 227 is selected, the information in a page is printed on a full sheet of paper. When the 2 in 1 instructions 228 is selected, the information in two pages is printed on a full sheet of paper. When the 4 in 1 instructions 229 is selected, the information in four pages is printed on a full sheet of paper. For the print page setting region, no selection can be made else than one of the three options for setting as above.

The single face and double face setting region 222 comprises a single face instructions 230 and double face setting instructions 231. Selection is made as to whether the printing is made on both faces of the sheet of paper or on a single face of paper. This single face and double face setting region 222 is selectable for only one of the two.

The staple and sort setting region 223 comprises a staple instructions 232 and sort instructions 233. The staple instructions 232 are selected in the case of binding with a staple. The sort instructions 233 are selected in the case of sorting. In the staple and sort setting region 223, the respective instructions may be operated independently.

The print number of copies setting region 224 sets the number of copies to be printed. By manipulating the bar slidable up and down shown laterally in the drawing, increase or decrease in number is obtained.

When the "return" button 225 is touched, the set information is cleared to have the step returned to the document selection screen 210 of FIG. 17.

When the "print" button 226 is touched, printing is started with the contents set here.

Next, at the time of the transmission of the mail from PC1, the server 2 arranges the received mails into a group. When a bucket communication is utilized in this case, the sequential order may become irregular and receiving may be done with the server 2. Further, although there is no problem if all the divided mails can be received, there may be cases where the condition of the intermediate communication line is aggravated. Therefore, in receiving the divisional mail, if all the divisional mails are not received within a certain time, the server 2 will either discard said mail or send a reply to the source sender to the effect that it failed to receive all the contents due to the error on the part of the sender.

FIG. 19 shows an example of constitution of the divisional mail control table 250 to be used by the server 2 at this time. The controller 21 of the server 2 provides a divisional mail control table 250 in the memory 22. Alternatively, this may be provided on the HDD 23.

This divisional mail control table 250 is constituted by the mail ID field 251, group ID field 252, initial mail receipt date & time field 253, this mail receipt date & time field 254, serial number field 255, and content field 256.

In the mail ID field 251, an ID of the mail is stored. In the group ID field 252, the number of each group of the divisional mail is stored. In the initial mail receipt date & time field 253, the date & time of the first arriving mail of the divisional mail is stored. In the mail receipt date & time field 254, the date & time at which the mail is received is stored. In the serial number field 255, serial numbers of the divisional mails are stored. In the content field 256, the place where the mail is stored is stored.

The controller 21 of the server 2 controls the divisional mail using the divisional mail control table 250, and in the event that all the divisional mails are not received in a predetermined time, it discards the received portion or sends a mail of error to the transmitting source.

Next, in the printing system having such a constitution, the action of the server 2 to receive the mail and store it in the memory 22 or HDD 23 is explained.

At first, explanation is given on the first example.

Figure 20:
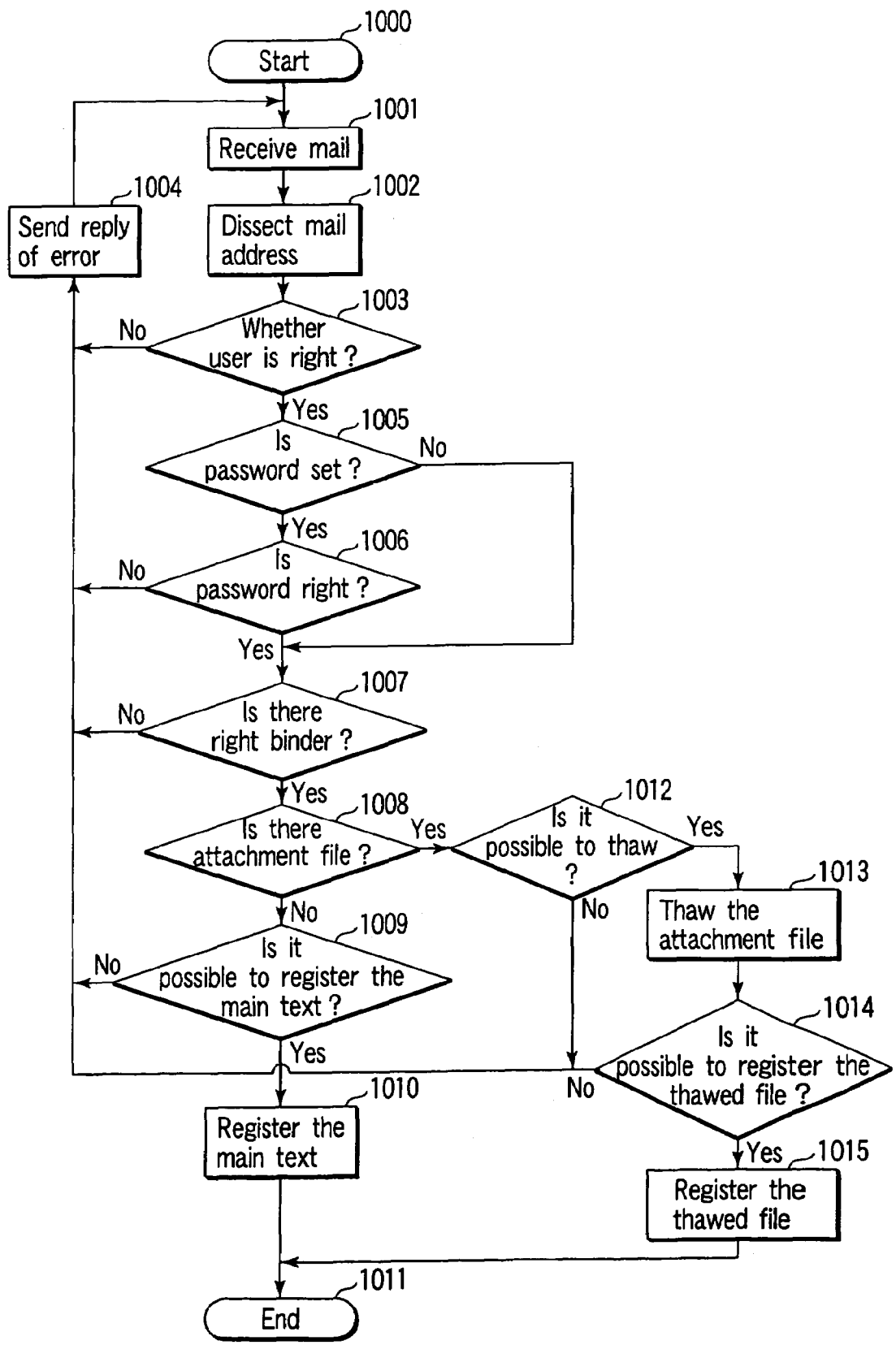
FIG. 20 is a flow chart for explaining the registration action of the server in the printing system according to the first example.

The registration action of the server 2 in the printing system according to the first example of this invention is explained with reference to the flow chart of FIG. 20. The flow chart of FIG. 20 shows extraction of the characteristic portions only, so as to facilitate understanding the invention.

At first, the operation of the server is started (step 1000).

Continuously, the controller 21 of the server 2 receives the mail through the communication interface 24 (step 1001).

The controller 21 dissects the header part (mail address) of the received mail (step 1002) and judges whether the user is right or not (step 1003). Here, if the user is not correct, the controller 21 sends a reply mail to the sender informing the error of the user (step 1004), and returns to the step 1001 to receive the mail.

When it is judged that the user is right in step 1003, the controller 21 judges whether the password is set on the user or not (step 1005).

In case the password is set, the controller 21 judges whether the said password is right or not (step 1006). Here, in the event that the password is not right, the controller 21 sends a reply mail of error to the effect that the password is not right to the sender (step 1004), returns to step 1001 and receives the mail.

In case it is judged that the password is right in step 1006, and in case of the absence of the password setting in step 1005, the controller 21 judges whether the binder is correct or not in the mail (step 1007). Here, in case the binder is not correct, the controller 21 sends a reply mail of error to the effect that the binder is not right to the sender (step 1004), returns to step 1001 and receives the mail.

In case it is judged that the binder is correct in step 1007, the controller 21 judges whether the main text can be stored direct or not (step 1009). Here, in case the main text cannot be stored, the controller 21 sends a reply mail of error to the effect that no information that can be stored is attached (step 104), and returns to step 1001 to receive the mail.

In case the main text can be stored in step 1009, the controller 21 stores the main text (step 1010) and terminates a sequence of action (step 1011).

In case there is an attachment file in step 1008, the controller 21 judges whether said attachment file is possible to be thawed or not (step 1012). Here, in case the thawing is impossible, the controller 21 sends a reply mail of error to the sender to the effect that the thawing is impossible (step 1004), and returns to the step 1001 to receive the mail.

In case it is judged that the thawing is impossible in step 1012, the controller 21 thaws the attachment file (step 1013). Continuously, the controller 21 judges whether the thawed file can be stored or not (step 1014). Here, in case the thawed file cannot be stored, the controller 21 sends a reply of error mail to the sender to the effect that the thawed file cannot be stored (step 1004), returns to the step 1001, and receives the mail.

In case the file thawed in the step 1013 can be stored, the controller 21 stores the thawed file (step 1015) to terminate a sequence of action (step 1011).

Next, explanation is made on the second example.

Figure 21:
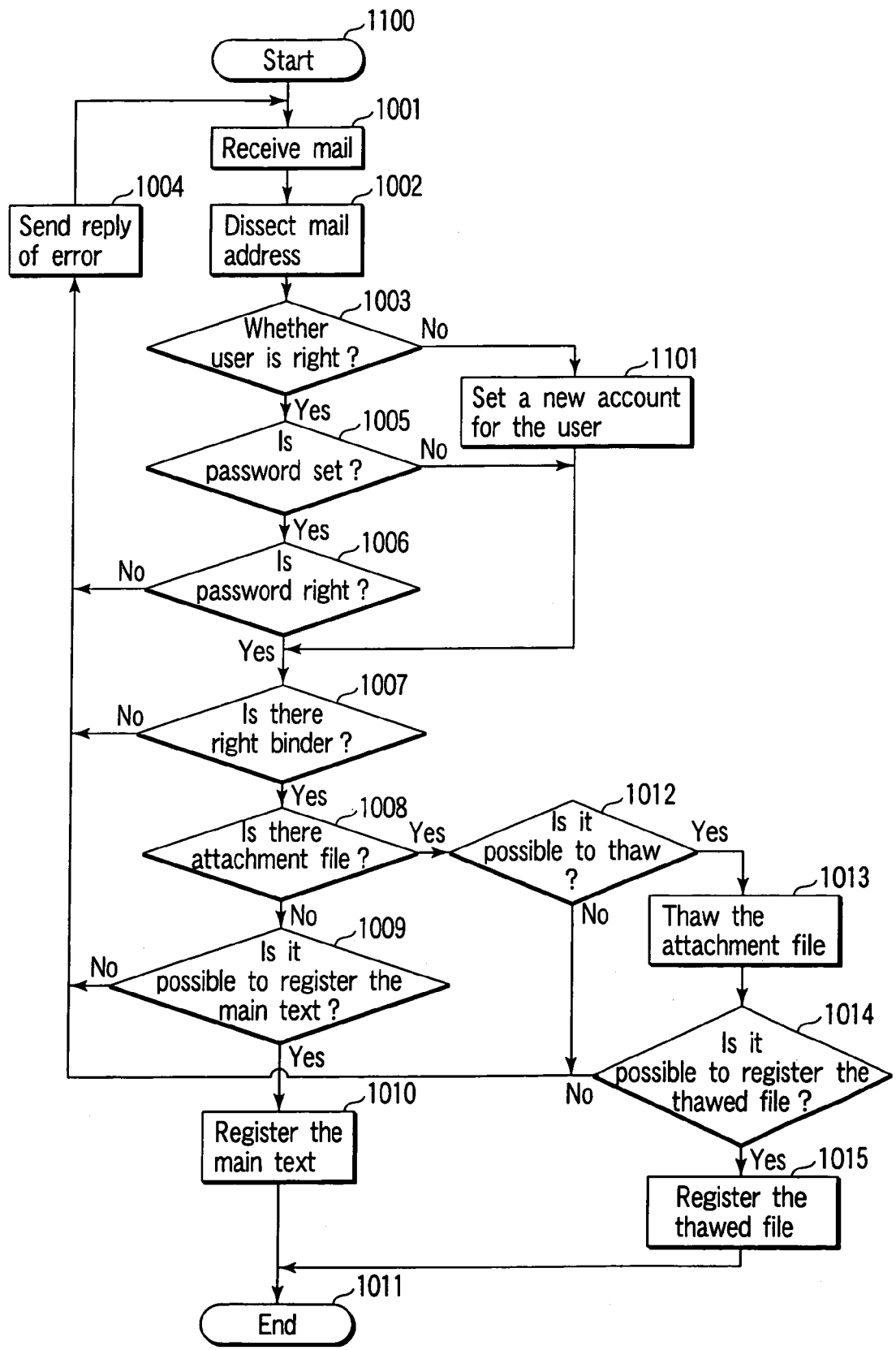
FIG. 21 is a flow chart for explaining the registration action of the server in the printing system according to the second example.

The registration operation of the server 2 in the printing system according to the second example of this invention is explained with reference to the flow chart of FIG. 21. The actions same as those of the first example are indicated by the same steps and explanation is omitted.

At first, the operation of the server 2 is started (step 1100). Steps 1001-1003 are executed.

In case the user has not been right in step 1003, the controller 21 of the server 2 newly prepares the account for said user (step 1101).

In case the user has been found to be right in step 1003, the steps 1005, 1006 are executed.

And, in case there has been no password setting in step 1005, or the password has been judged to be right in step 1006, or when the user account has been newly prepared in step 1101, the controller 21 judges whether the binder in the mail is right or not (step 1007).

Depending on the judgment in the step 1007, the steps 1008-1015 are executed.

Next, the third example is explained.

Figure 22:
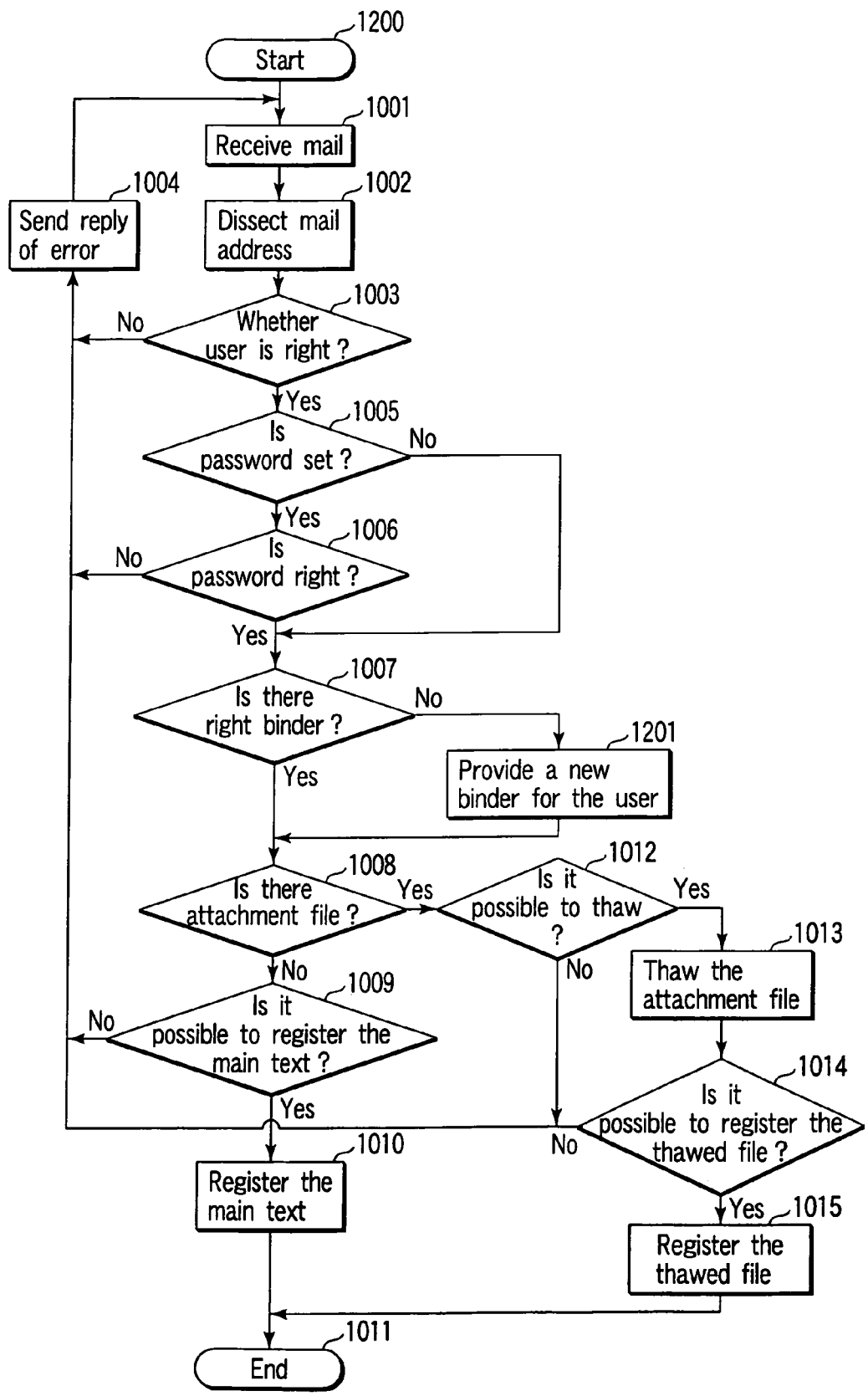
FIG. 22 is a flow chart for explaining the registration action of the server in the printing system according to the third example.

The registration operation of the server 2 in the printing system according to the third example of this invention is explained with reference to the flow chart of FIG. 22. The actions same as those of the first example are indicated by the same steps and explanation is omitted.

At first, the operation of the server 2 is started (step 1200). Steps 1001-1007 are executed.

In case the binder has not been right in step 1007, the controller 21 of the server 2 newly prepares the account for said name (step 1201).

And, in case the binder has been judged to be right in step 1007, or when the binder in said name has been newly prepared in step 1201, the controller 21 judges whether there is attachment file or not (step 1008).

Depending on the judgment in the step 1008, the steps 1009-1015 are executed.

Next, the fourth example is explained.

Figure 23:
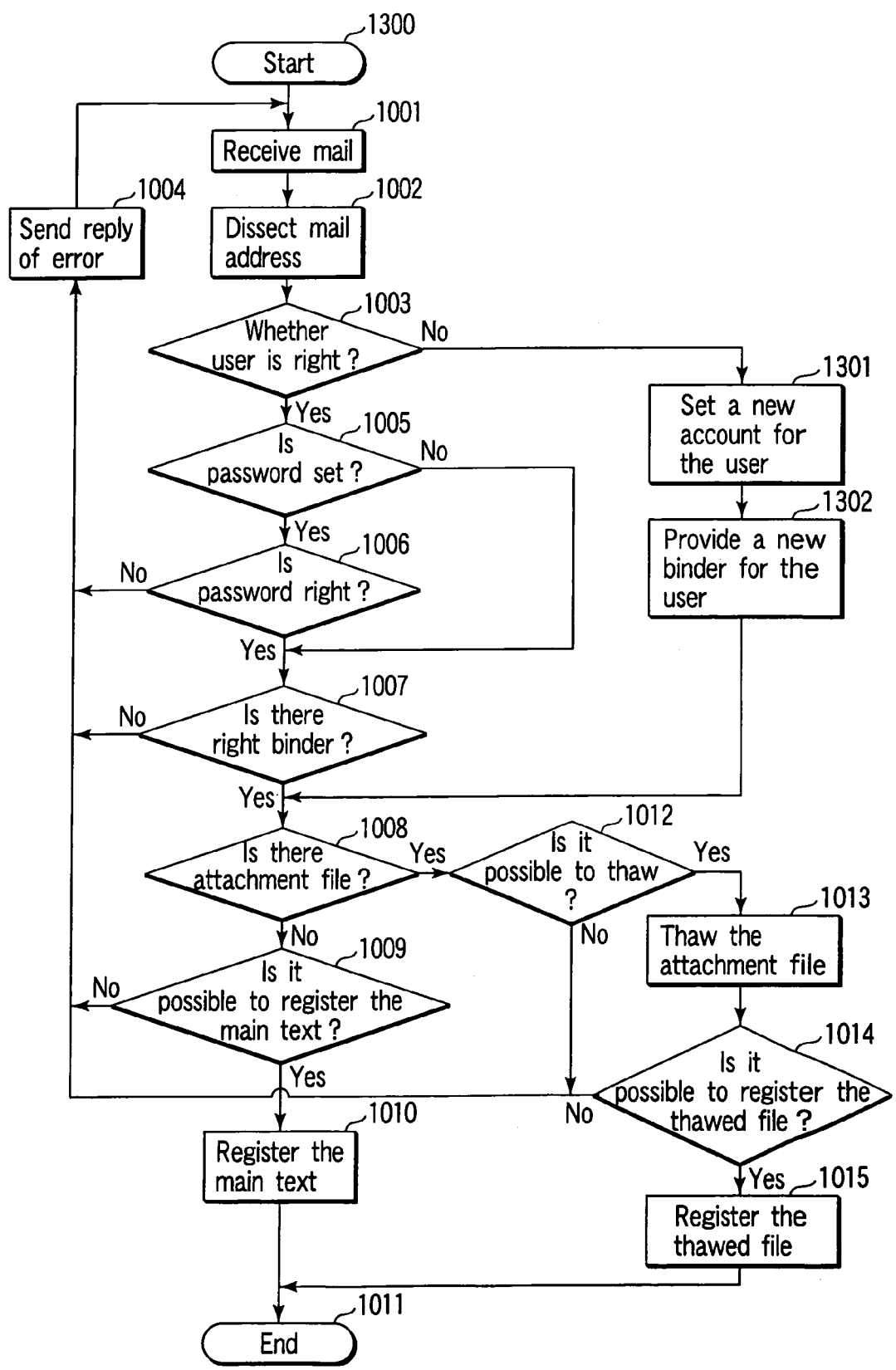
FIG. 23 is a flow chart for explaining the registration action of the server in the printing system according to the fourth example.

The registration operation of the server 2 in the printing system according to the fourth example of this invention is explained with reference to the flow chart of FIG. 23. The actions same as those of the first example are indicated by the same steps and explanation is omitted.

At first, the operation of the server 2 is started (step 1300). Steps 1001-1003 are executed.

In case the user has not been right in step 1003, the controller 21 of the server 2 newly prepares the account for said user (step 1301), and further prepares a new binder designated by the mail for said user (step 1302).

And, in case the user has been judged to be right in step 1003, the steps 1005, 1006, and 1007 are executed.

And, when the binder has been judged to be right in step 1007, or when a new binder has been set up in step 1302, the controller 21 judges whether there is attachment file or not (step 1008).

Depending on the judgment in the step 1008, the steps 1009-1015 are executed.

Next, the fifth example is explained.

Figure 24:
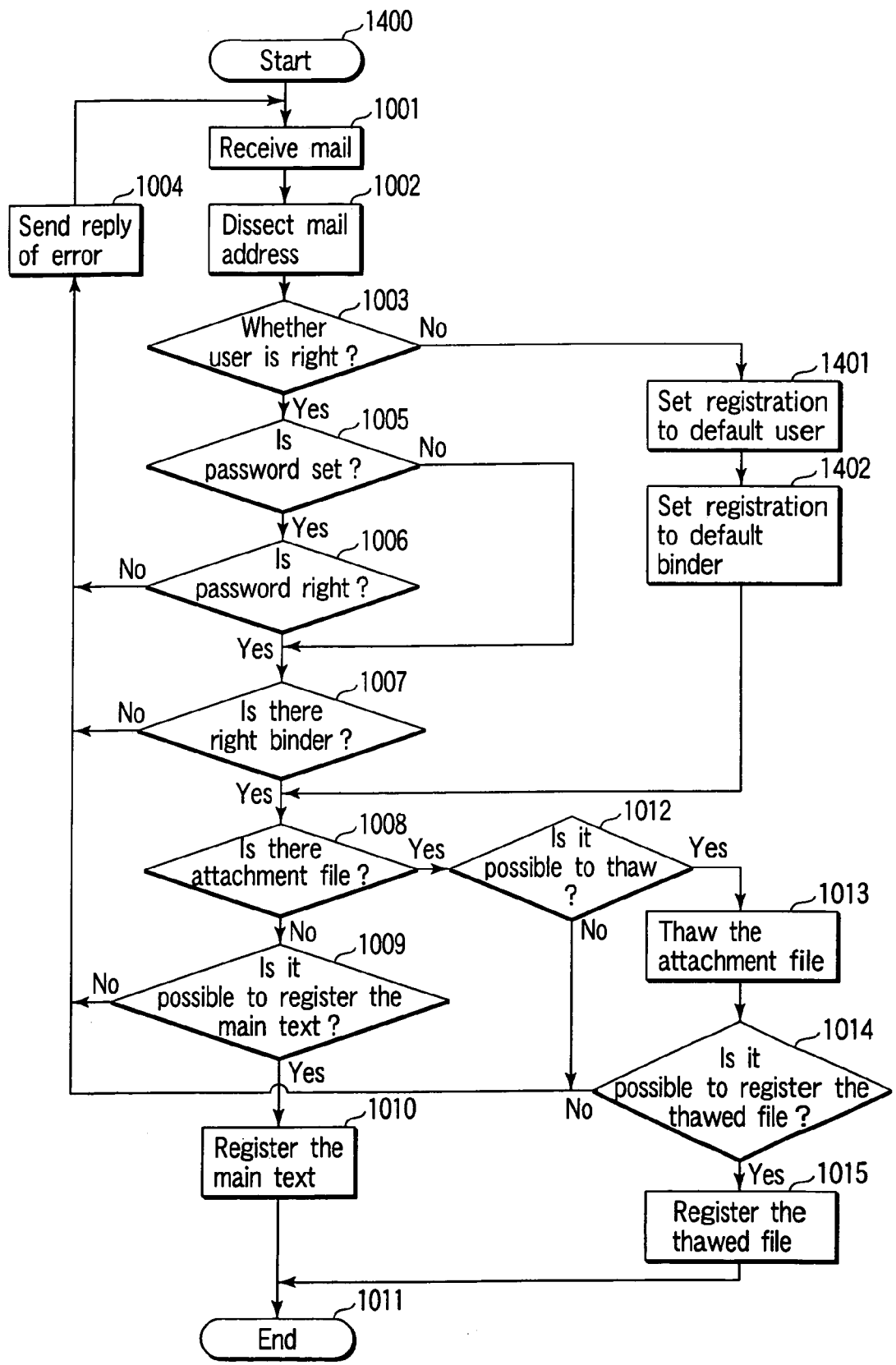
FIG. 24 is a flow chart for explaining the registration action of the server in the printing system according to the fifth example.

The registration operation of the server 2 in the printing system according to the fifth example of this invention is explained with reference to the flow chart of FIG. 24. The actions same as those of the first example are indicated by the same steps and explanation is omitted.

At first, the operation of the server 2 is started (step 1400). Steps 1001-1003 are executed.

In case the user has not been right in step 1003, the controller 21 of the server 2 sets to store in a default user (step 1401), and further, sets to store in the default binder of the default user (step 1402).

And, in case the user has been judged to be right in step 1003, the steps 1005, 1006, and 1007 are executed.

And, when the binder has been judged to be right in step 1007, or when a default binder has been set up in step 1402, the controller 21 judges whether there is attachment file or not (step 1008).

Depending on the judgment in the step 1008, the steps 1009-1015 are executed.

Next, the sixth example is explained.

Figure 25:
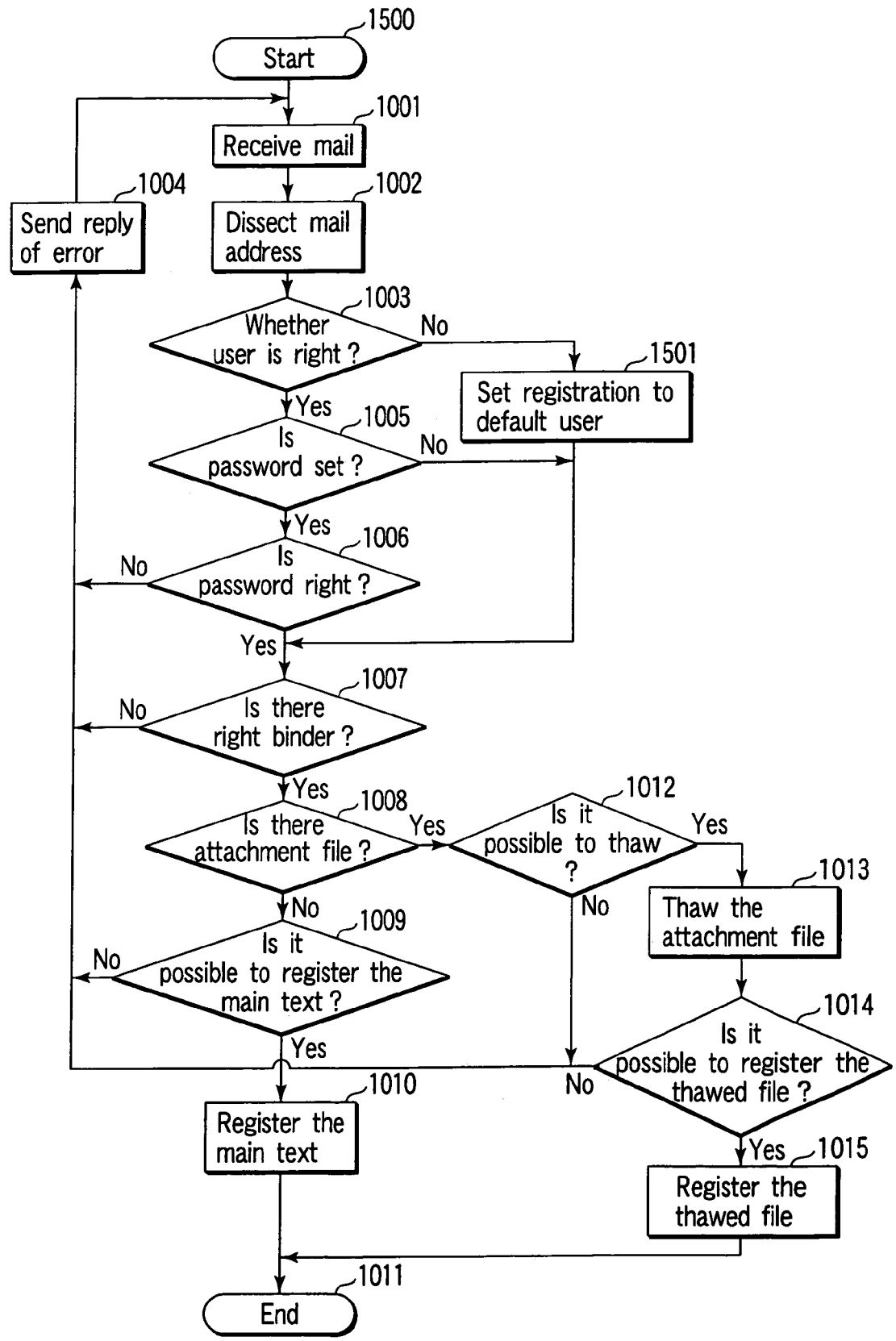
FIG. 25 is a flow chart for explaining the registration action of the server in the printing system according to the sixth example.

The registration operation of the server 2 in the printing system according to the sixth example of this invention is explained with reference to the flow chart of FIG. 25. The actions same as those of the first example are indicated by the same steps and explanation is omitted.

At first, the operation of the server 2 is started (step 1500). Steps 1001-1003 are executed.

In case the user has not been right in step 1003, the controller 21 of the server 2 sets to store in a default user (step 1501).

In case the user has been right in step 1003, the steps 1005, 1006 are executed.

And, in case there has been no password setting in step 1005, or in case the password has been judged to be right in step 1006, or when setting is made to store in a default user in step 1501, the controller 21 judges whether the binder in the mail is right or not (step 1007).

Depending on the judgment in the step 1007, the steps 1008-1015 are executed.

Next, the seventh example is explained.

Figure 26:
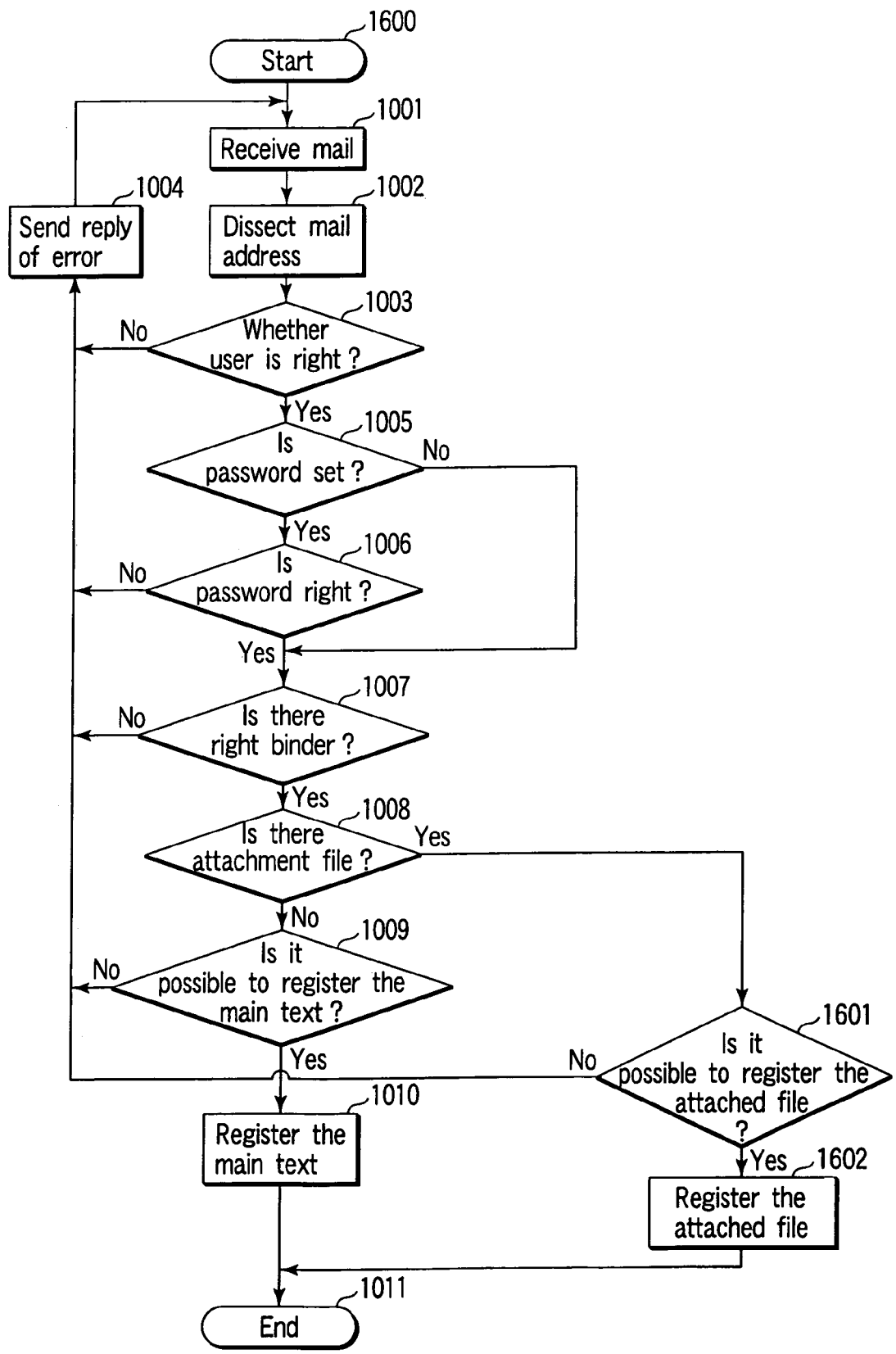
FIG. 26 is a flow chart for explaining the registration action of the server in the printing system according to the seventh example.

The registration operation of the server 2 in the printing system according to the seventh example of this invention is explained with reference to the flow chart of FIG. 26. The actions same as those of the first example are indicated by the same steps and explanation is omitted.

At first, the operation of the server 2 is started (step 1600). Steps 1001-1008 are executed.

In case there has been the attachment file in step 100, the controller 21 of the server 2 judges whether the attachment file is possible to be stored or not (step 1601). Here, in case it is judged impossible to be stored, the controller 21 sends a reply mail of error to the sender to the effect that the registration is impossible (step 1004), and returns to step 1001 to receive the mail.

In case the controller 21 has judged it possible to store in step 1601, the controller 21 stores the attachment file (step 1602), and terminates one operation (step 1011).

In case there has not been attachment file in step 1008, the steps 1009, 1010, and 1011 are executed.

Next, the eighth example is explained.

Figure 27:
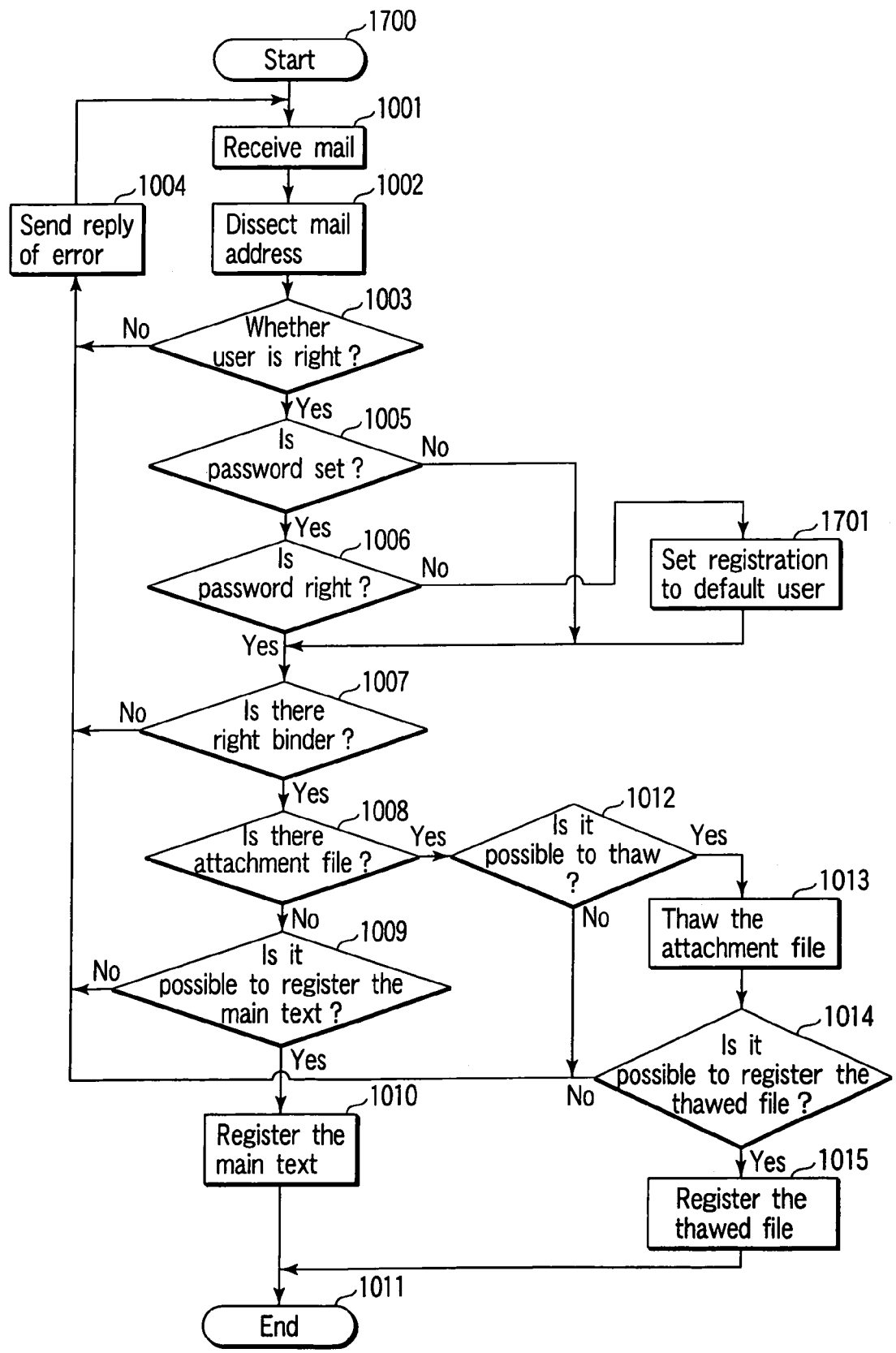
FIG. 27 is a flow chart for explaining the registration action of the server in the printing system according to the eighth example.

The registration operation of the server 2 in the printing system according to the eighth example of this invention is explained with reference to the flow chart of FIG. 27. The actions same as those of the first example are indicated by the same steps and explanation is omitted.

At first, the operation of the server 2 is started (step 1700). Steps 1001-1006 are executed.

In case the password has not been right in step 1006, the controller 21 of the server 2 sets to store in a default user (step 1701).

And, in case there has been no password setting in step 1005, or in case the password has been judged to be right in step 1006, or when setting is made to store in a default user in step 1701, the controller 21 judges whether the binder in the mail is right or not (step 1007).

Depending on the judgment in the step 1007, the steps 1008-1015 are executed.

Next, the ninth example is explained.

Figure 28:
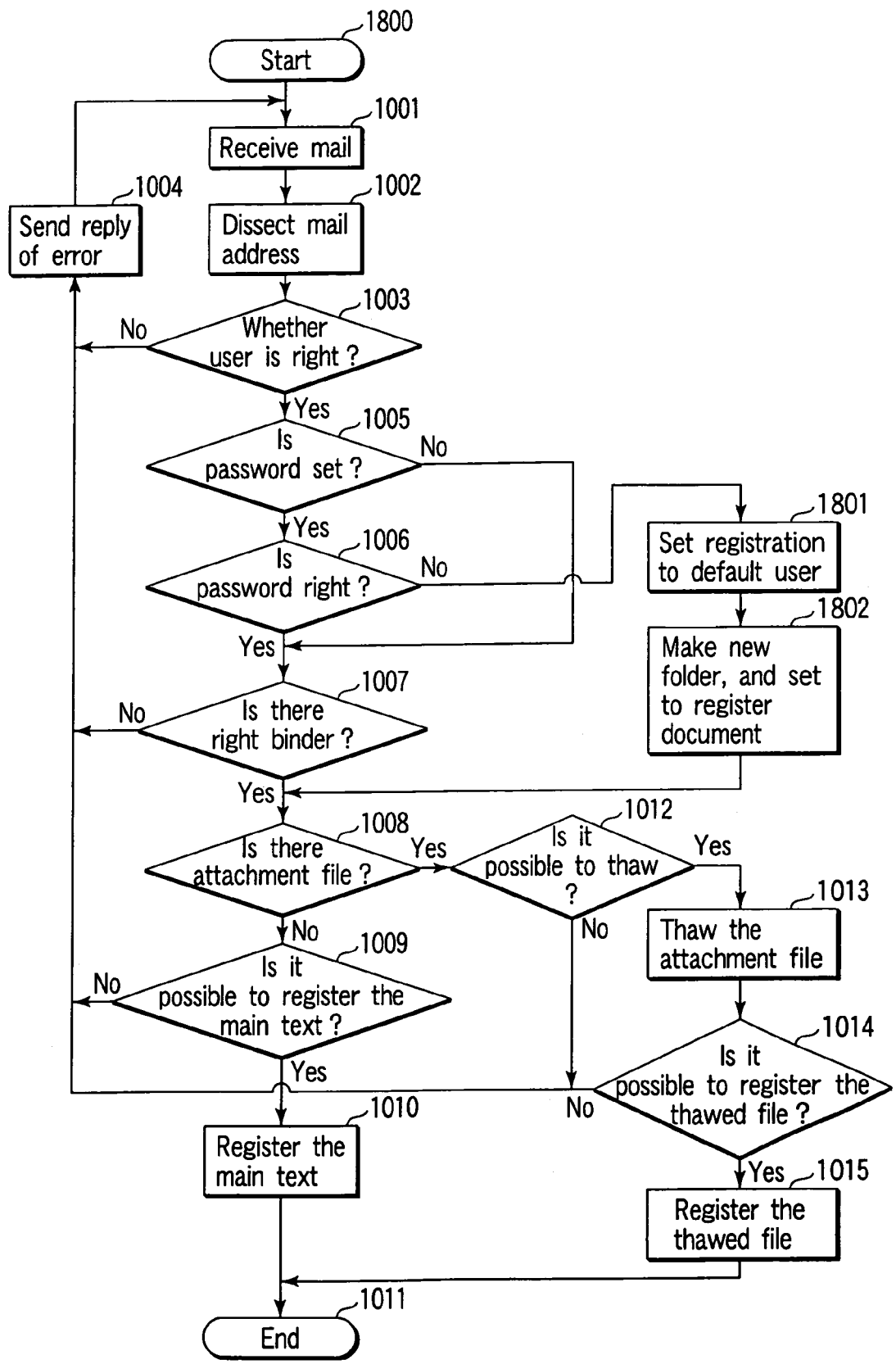
FIG. 28 is a flow chart for explaining the registration action of the server in the printing system according to the ninth example.

The registration operation of the server 2 in the printing system according to the ninth example of this invention is explained with reference to the flow chart of FIG. 28. The actions same as those of the first example are indicated by the same steps and explanation is omitted.

At first, the operation of the server 2 is started (step 1800). Steps 1001-1006 are executed.

In case the password has not been right in step 1006, the controller 21 of the server 2 sets to store in a default user (step 1801). Further, it prepares the folder of the mail as a new folder, and sets to store the document in said folder (step 1802).

And, in case there has been no password setting in step 1006, or in case the password has been judged to be right in step 1007, or when the folder of the mail is prepared as a new folder and setting is made to store the document in said folder in step 1802, the controller 21 judges whether there is an attachment file or not (step 1008).

Depending on the judgment in the step 1008, the steps 1008-1015 are executed.

Next, the tenth example is explained.

Figure 29:
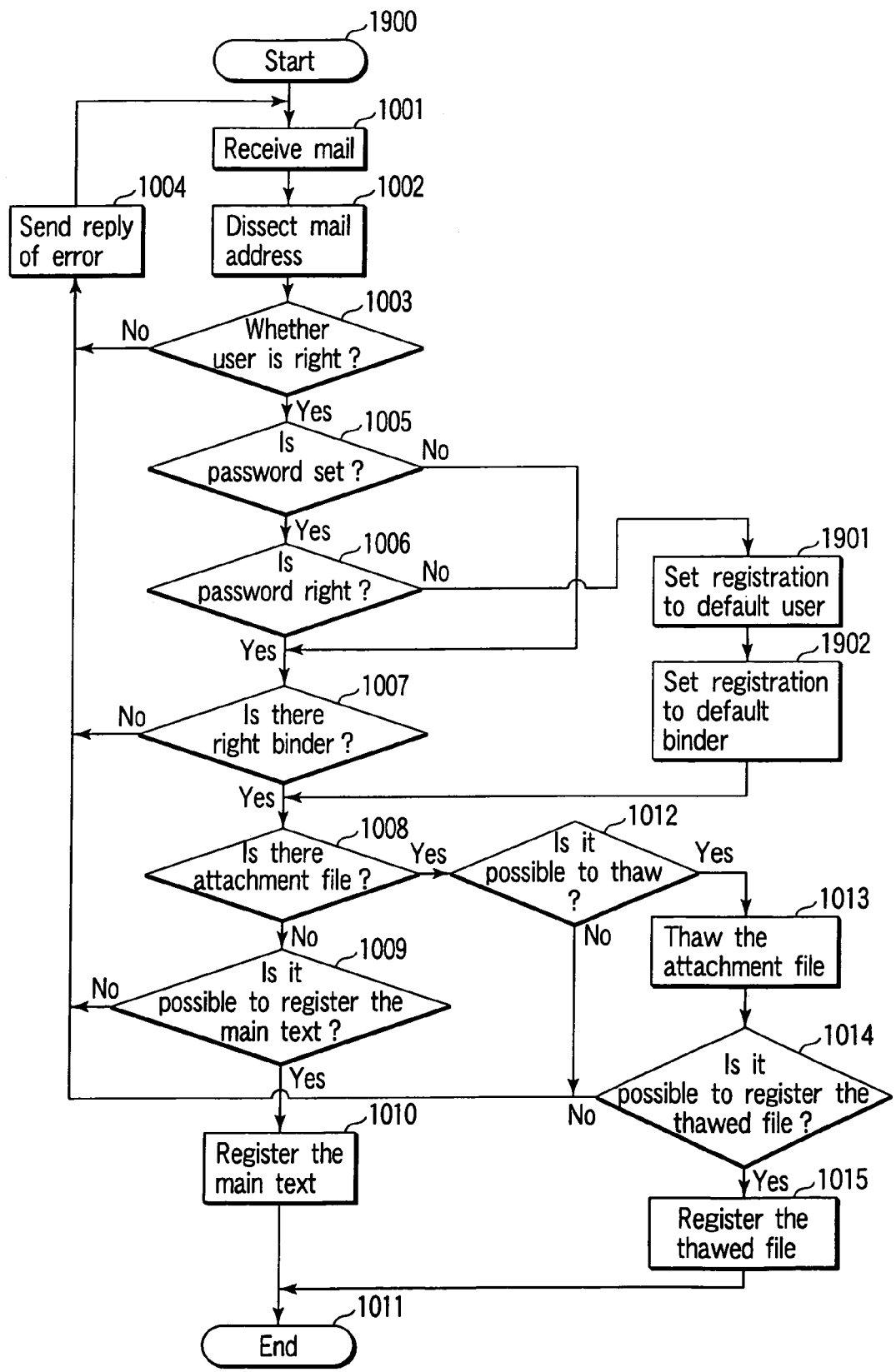
FIG. 29 is a flow chart for explaining the registration action of the server in the printing system according to the tenth example.

The registration operation of the server 2 in the printing system according to the tenth example of this invention is explained with reference to the flow chart of FIG. 29. The actions same as those of the first example are indicated by the same steps and explanation is omitted.

At first, the operation of the server 2 is started (step 1900). Steps 1001-1006 are executed.

In case the password has not been right in step 1006, the controller 21 of the server 2 sets to store in a default user (step 1901), and sets to store the document in a default binder (step 1902).

And, in case the password has been judged to be right in step 1006 and the binder has been right in step 1007, or when setting is made to store the document in a default binder in step 1902, the controller 21 judges whether there is an attachment file or not (step 1008).

Depending on the judgment in the step 1008, the steps 1008-1015 are executed.

Next, the eleventh example is explained.

Figure 30:
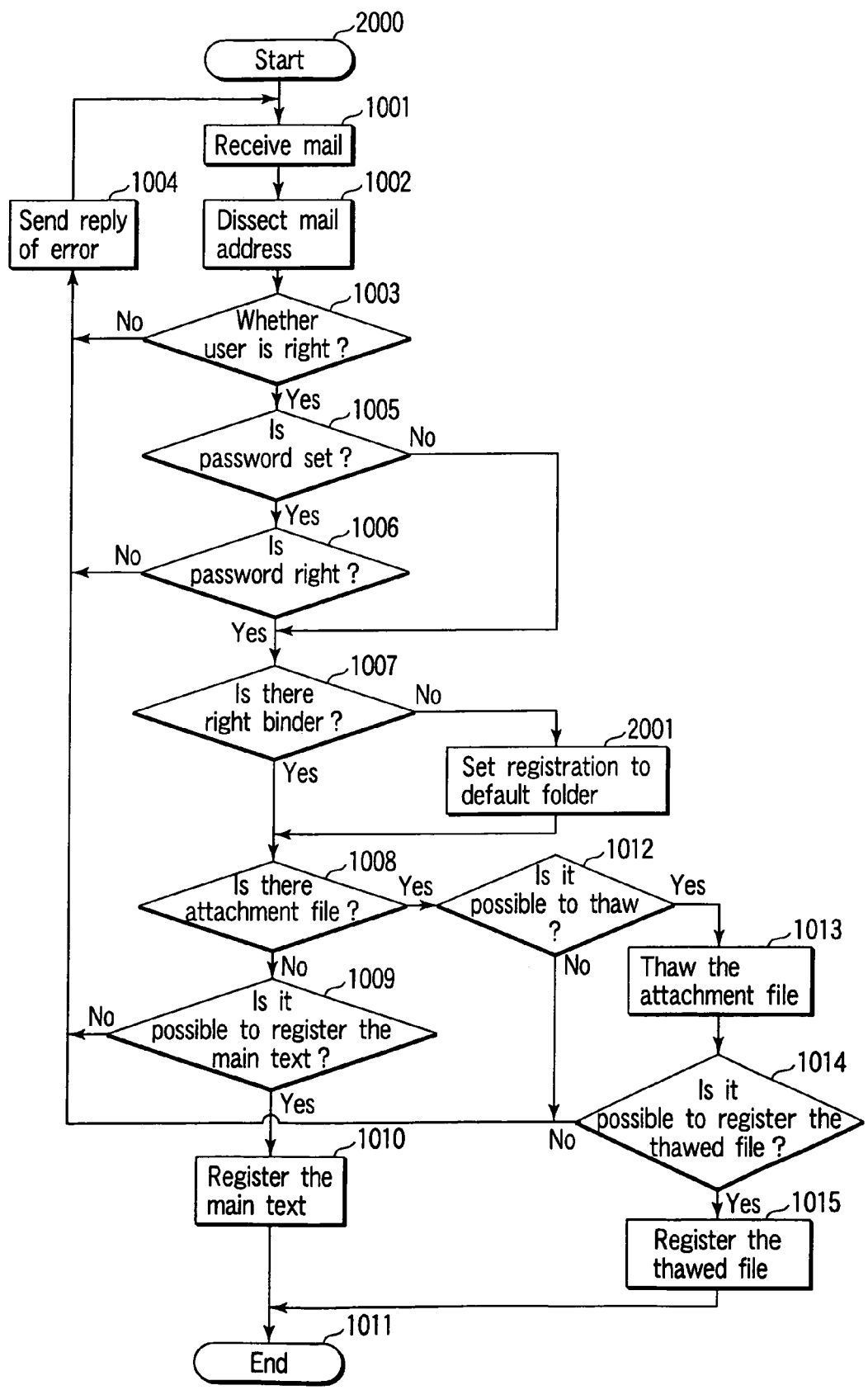
FIG. 30 is a flow chart for explaining the registration action of the server in the printing system according to the eleventh example.

The registration operation of the server 2 in the printing system according to the eleventh example of this invention is explained with reference to the flow chart of FIG. 30. The actions same as those of the first example are indicated by the same steps and explanation is omitted.

At first, the operation of the server 2 is started (step 2000). Steps 1001-1007 are executed.

In case the binder has not been right in step 1007, the controller 21 of the server 2 sets to store in a default folder (step 2001).

And, in case it is judged that the binder is right in step 1007, or when setting is made to store in a default folder in step 2001, the controller 21 judges whether there is an attachment file or not (step 1008).

Depending on the judgment in the step 1008, the steps 1009-1015 are executed.

Next, the twelfth example is explained.

Figure 31:
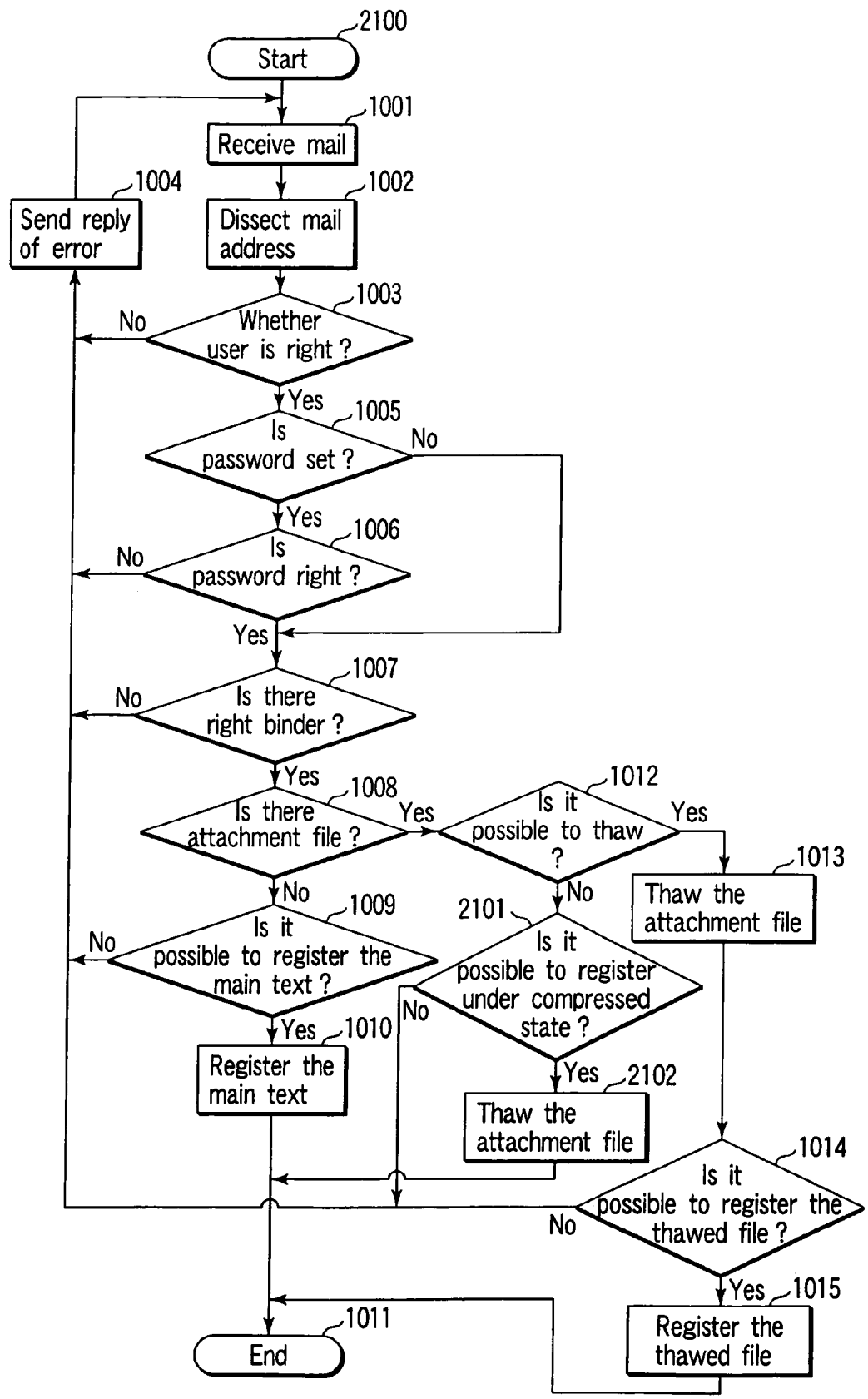
FIG. 31 is a flow chart for explaining the registration action of the server in the printing system according to the twelfth example.

The registration operation of the server 2 in the printing system according to the twelfth example of this invention is explained with reference to the flow chart of FIG. 31. The actions same as those of the first example are indicated by the same steps and explanation is omitted.

At first, the operation of the server 2 is started (step 2100). Steps 1001-1012 are executed.

In case the thawing is impossible in step 1012, the controller 21 of the server 2 judges whether it is possible to store in a compressed state without thawing or not (step 2101). In case it is not possible to store under the compressed state without thawing, the controller 21 sends a reply mail of error to that effect to the original sender (step 1004), and returns to the step 1001 to receive the mail. Furthermore, if it is possible to store in a compressed state in step 2101, the controller stores the attachment file under the compressed state (step 2102) to complete an operation cycle (step 1011).

In case the thawing is possible in step 1012, steps 1013-1015 are executed.

Next, the thirteenth example is explained.

The registration operation of the server 2 in the printing system according to the thirteenth example of this invention is explained with reference to the flow chart of FIG. 32. The actions same as those of the first example are indicated by the same steps and explanation is omitted.

At first, the operation of the server 2 is started (step 2200). Steps 1001-1008 are executed.

In case there is an attachment file in step 1008, the controller 21 of the server 2 judges whether it is possible to thaw said attachment file including the directory (step 2201). Here, in case it is not possible to thaw, the controller 21 sends a reply mail of error to the effect that the thawing is impossible to the original sender (step 1004), and returns to the step 1001 to receive the mail.

If it is judged to be possible to thaw including the directory in step 2201, the controller 21 thaws the attachment file including the directory (step 2202). Continuously, the controller 21 judges whether it is possible to store the thawed file including the directory or not (step 2203). Here, in case registration is not possible, the controller 21 sends a reply mail of error to the effect that the thawed file including the directory cannot be stored to the original sender (step 1004), and returns to the step 1001 to receive the mail.

Furthermore, if it is possible to store in step 2203, the controller 21 stores the thawed file including the directory (step 2204) to complete an operation cycle (step 1011).

In case there is no attachment file in step 1008, steps 1009-1011 are executed.

Next, the fourteenth example is explained.

Figure 33:
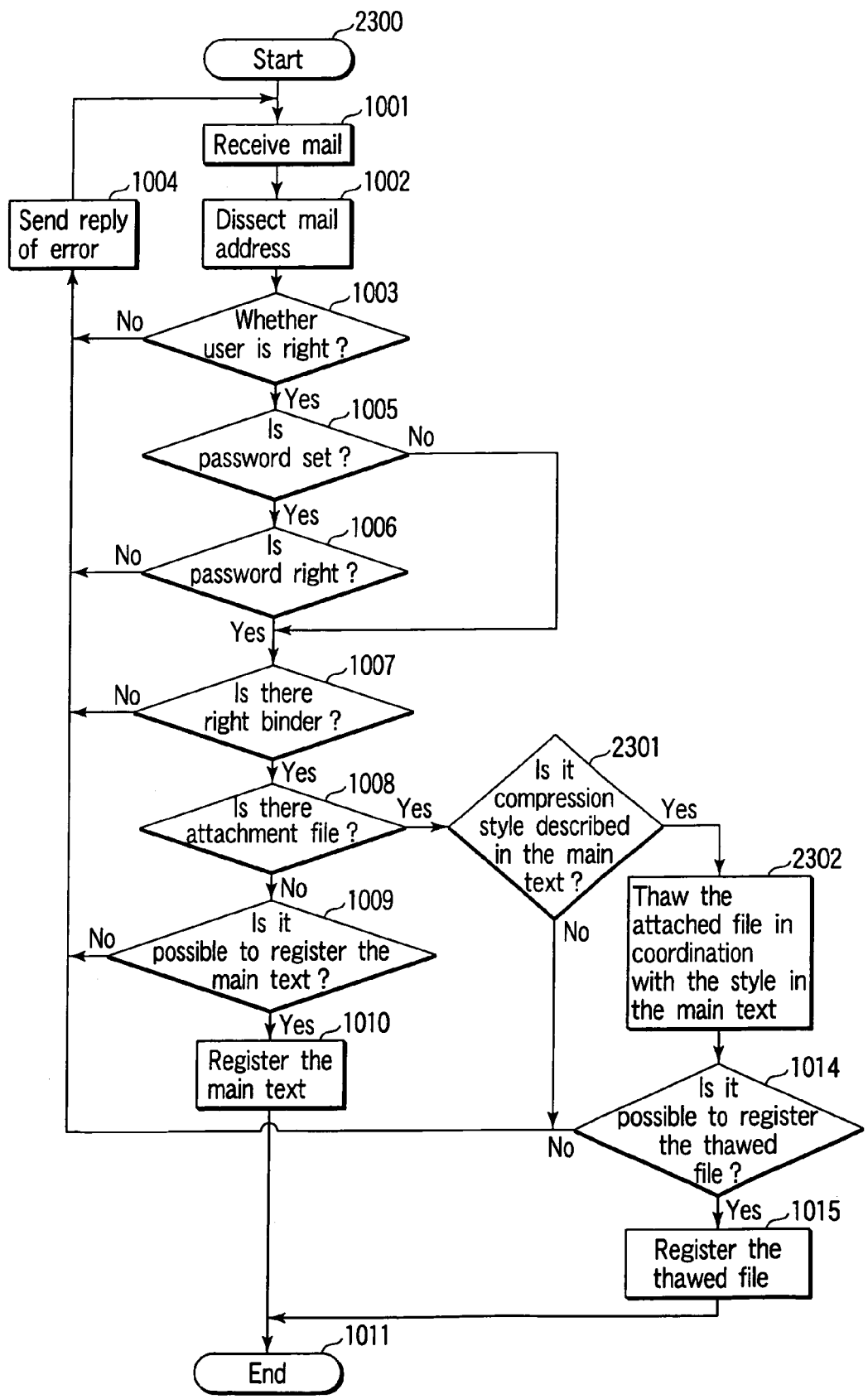
FIG. 33 is a flow chart for explaining the registration action of the server in the printing system according to the fourteenth example.

The registration operation of the server 2 in the printing system according to the fourteenth example of this invention is explained with reference to the flow chart of FIG. 33. The actions same as those of the first example are indicated by the same steps and explanation is omitted.

At first, the operation of the server 2 is started (step 2300). Steps 1001-1008 are executed.

In case there is an attachment file in step 1008, the controller 21 of the server 2 judges whether the compression form of said attachment file is described in the main text of the mail or not (step 2301). Here, in case it is not described, the controller 21 sends to the original sender a reply mail of error to the effect that due to no description of the compression style the thawing is impossible (step 1004), and returns to the step 1001 to receive the mail.

In case it is judged to be possible to thaw due to description of the compression style in step 2301, the controller 21 thaws the attachment file in coordination with the compression style (step 2302). Continuously, the controller 21 executes the steps 1014, 1015.

In case there is no attachment file in step 1008, steps 1009-1011 are executed.

Next, the fifteenth example is explained.

Figure 34:
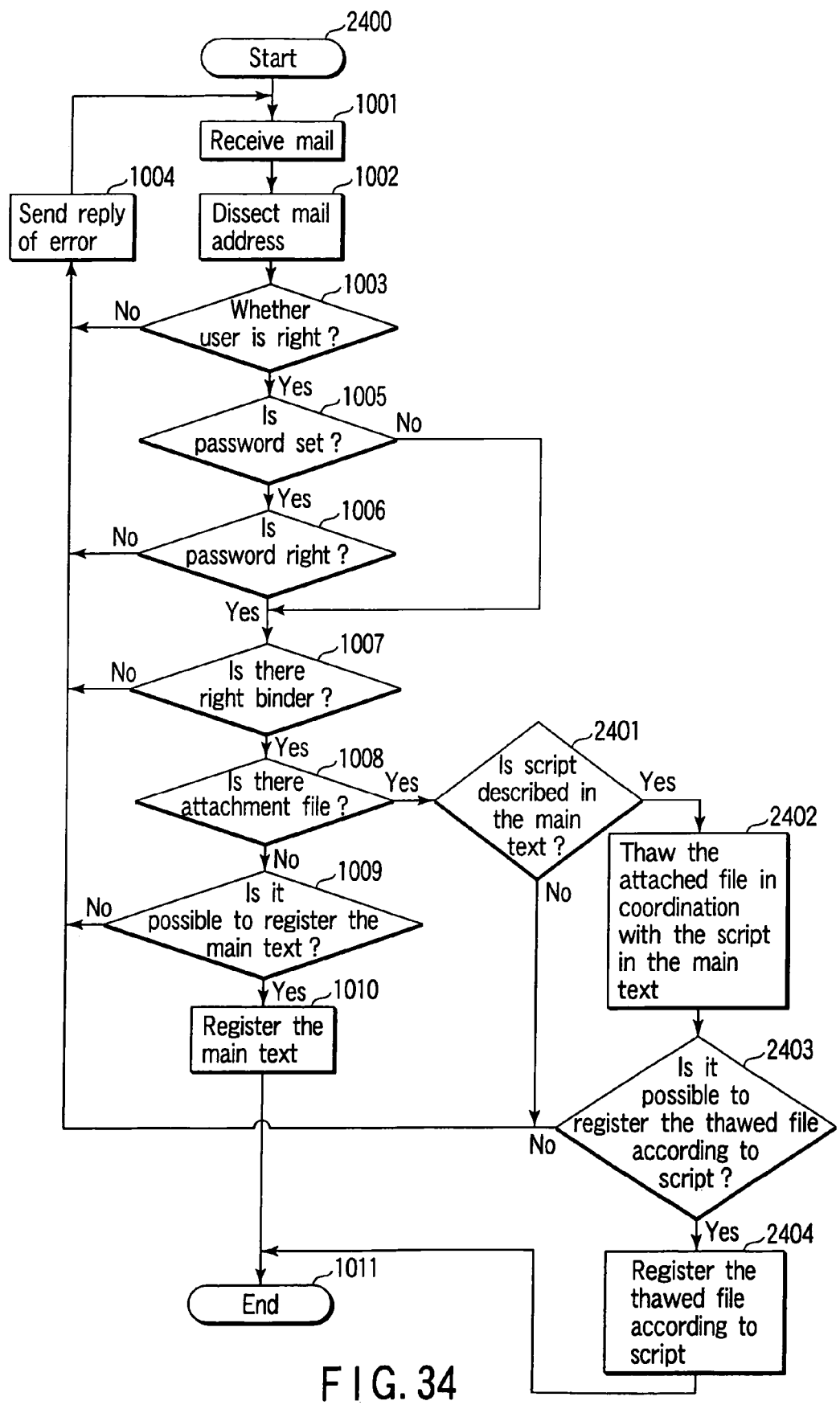
FIG. 34 is a flow chart for explaining the registration action of the server in the printing system according to the fifteenth example.

The registration operation of the server 2 in the printing system according to the fifteenth example of this invention is explained with reference to the flow chart of FIG. 34. The actions same as those of the first example are indicated by the same steps and explanation is omitted.

At first, the operation of the server 2 is started (step 2400). Steps 1001-1008 are executed.

In case there is an attachment file in step 1008, the controller 21 of the server 2 judges whether the script is described in the main text of the mail or not (step 2401). Here, in case it is not described, the controller 21 sends to the original sender a reply mail of error to the effect that script is not described (step 1004), and returns to the step 1001 to receive the mail.

In case it is judged to be possible to thaw due to description of script in step 2401, the controller 21 thaws the attachment file in coordination with the script in the main text of mail (step 2402). Continuously, the controller 21 judges whether the thawed file can be stored or not (step 2403). Here, in case the thawed file in accord with the script cannot be stored, the controller 21 sends a reply mail of error to the effect that the thawed file in coordination with the script cannot be stored to the original sender (step 1004), and returns to the step 1001 to receive the mail.

Furthermore, if it is possible to store the thawed file in accord with the script in step 2403, the controller 21 stores the thawed file in accord with the script (step 2404) to complete an operation cycle (step 1011).

In case there is no attachment file in step 1008, steps 1009-1011 are executed.

Next, the sixteenth example is explained.

An outline of the printing system in accordance with the sixteenth example of this invention is explained.

In the above-mentioned examples, the mail is analyzed and the document is stored. Against this, in this sixteenth example, the user previously has access to the server 2 from PC1 by WEB, inputs the user ID and password, and selects the folder to be stored. Thereafter, a mail coordinate with the information is sent to PC1, in which the user attaches to said mail the document to be stored in the reply and sends it to the server 2, so that the document is stored.

Figure 35:
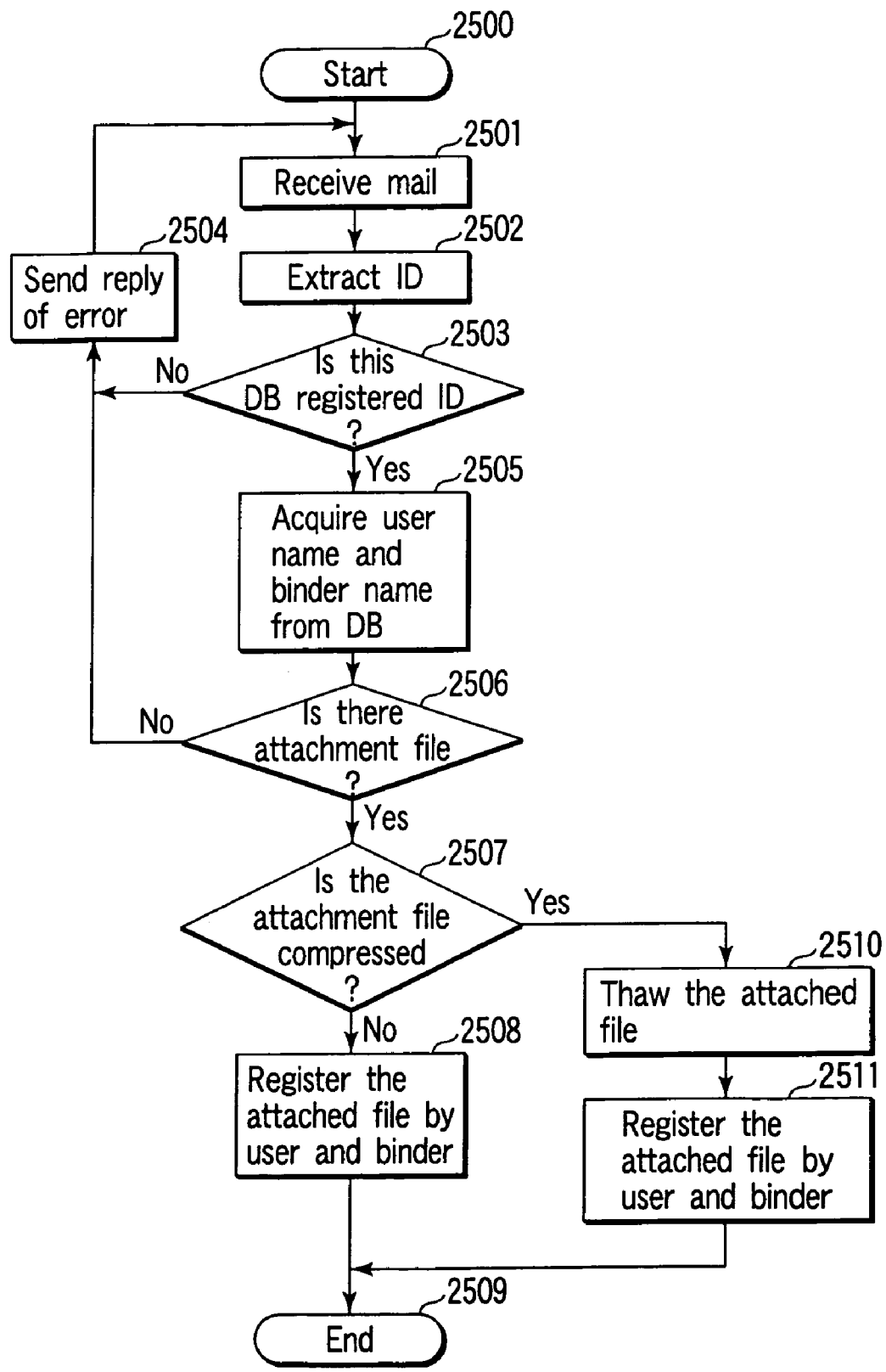
FIG. 35 is a flow chart for explaining the registration action of the server in the printing system according to the sixteenth example.

Accordingly, the registration action of the server 2 in the printing system according to the sixteenth example of this invention is explained in reference to the flow chart of FIG. 35. In this flow chart of FIG. 35, in order to facilitate understanding the invention, only the characteristic portions are extracted.

At first, the operation of the server 2 is started (step 2500).

Continuously, the controller 21 of the server 2 receives the mail through the communication interface 24 (step 2501).

The controller 21 extracts the registration ID from the mail (step 2502). This is because the server 2 attaches ID in transmitting a mail, and also attaches ID to the reply mail. The server 2 controls the ID by the data base 23*a* in the HDD23, so that it specifies from the ID "user", "password", and "folder", and the like of stored contents through the data base 23*a*.

The controller 21 searches whether the extracted ID is the ID stored in the data base 23*a* or not (step 2503). In case it has been found to be the ID not stored in the data base 23*a*, the controller 21 sends to the original sender a reply mail of error to that effect (step 2504), and returns to the step 2501 to receive the mail.

In case it is found to be the ID stored in the data base 23*a* in step 2503, the controller 21 acquires the user name and the folder name from the data base 23*a* (step 2505).

And, the controller 21 judges whether the attachment file is included or not (step 2506). In case the attachment file is not found, the controller 21 sends a reply mail of error to that effect to the original sender (step 2504), and returns to the step 2501 to receive the mail.

In case there is an attachment file in step 2506, the controller 21 judges whether said attachment file is compressed or not (step 2507). Here, in case said attachment file is not compressed, the controller 21 stores the attachment file in the user and the binder (step 2508), and terminates a series of actions (step 2509).

In case the attachment file is compressed in step 2507, the controller 21 thaws the attachment file (step 2510). And the controller 21 stores the thawed attachment file in the user and the binder (step 2511), and terminates a series of actions (step 2509).

Next, the seventeenth example is explained.

Figure 36:
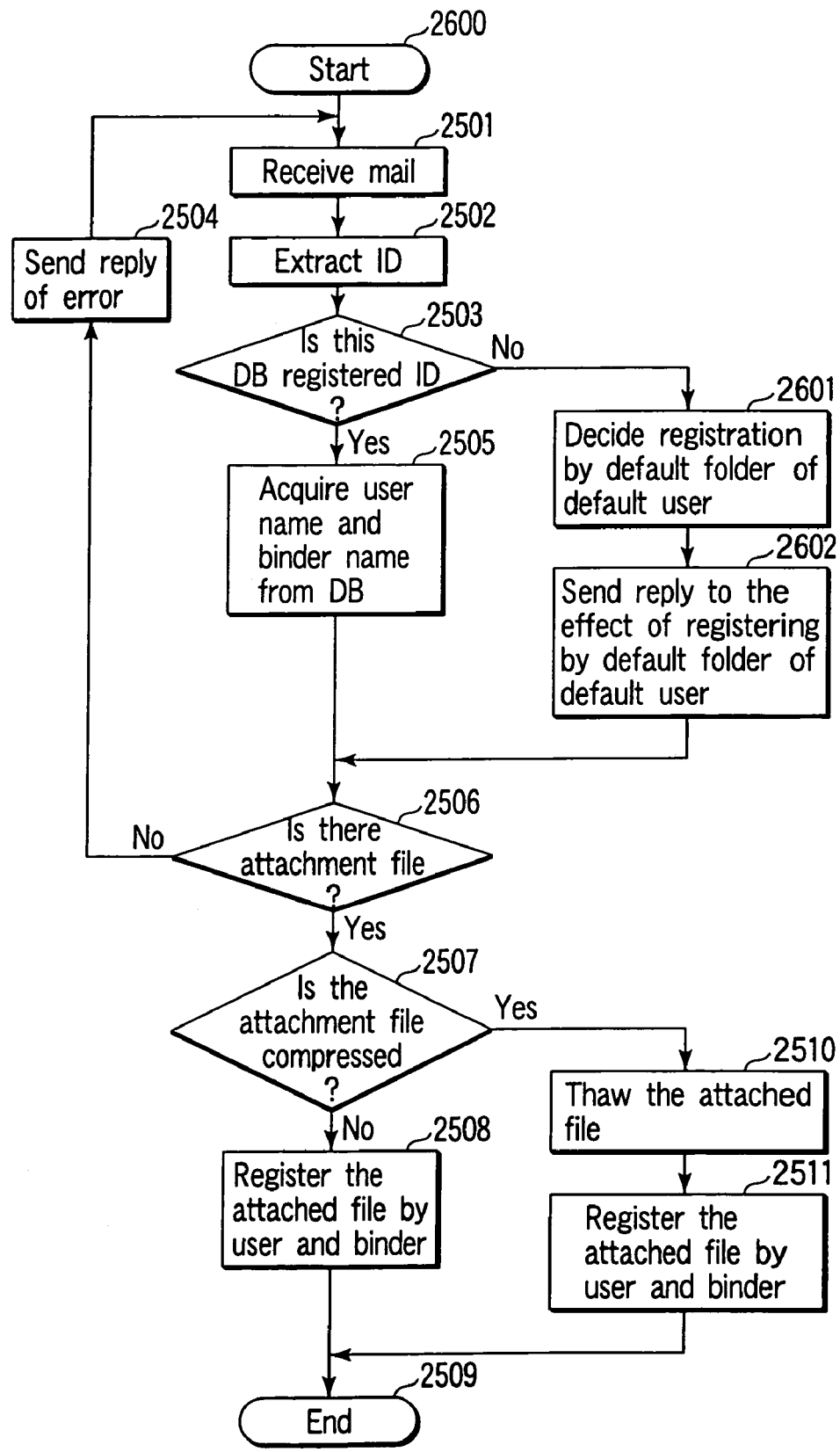
FIG. 36 is a flow chart for explaining the registration action of the server in the printing system according to the seventeenth example.

The registration operation of the server 2 in the printing system according to the seventeenth example of this invention is explained with reference to the flow chart of FIG. 36. The actions same as those of the sixteenth example are indicated by the same steps and explanation is omitted.

At first, the operation of the server 2 is started (step 2600). Steps 2501-2503 are executed.

In case the ID is one not described in the data base 23*a* in step 2503, the controller 21 sets to effect registration in the default folder of the default user (step 2601), and further sends to the original sender a mail of the contents to the effect that the registration is to be made in the default folder of the default user (step 2602).

In case the ID is one stored in the data base 23*a* in step 2503, the step 2505 is executed.

And, in case the user name and the folder name are acquired from the data base 23*a* in step 2505, or when the default folder of the default user is set in step 2601, the controller 21 judges whether there is an attachment file or not (step 2506).

Depending on the judgment of this step 2506, the steps 2507-2511 are executed.

Next, the eighteenth example is explained.

Figure 37:
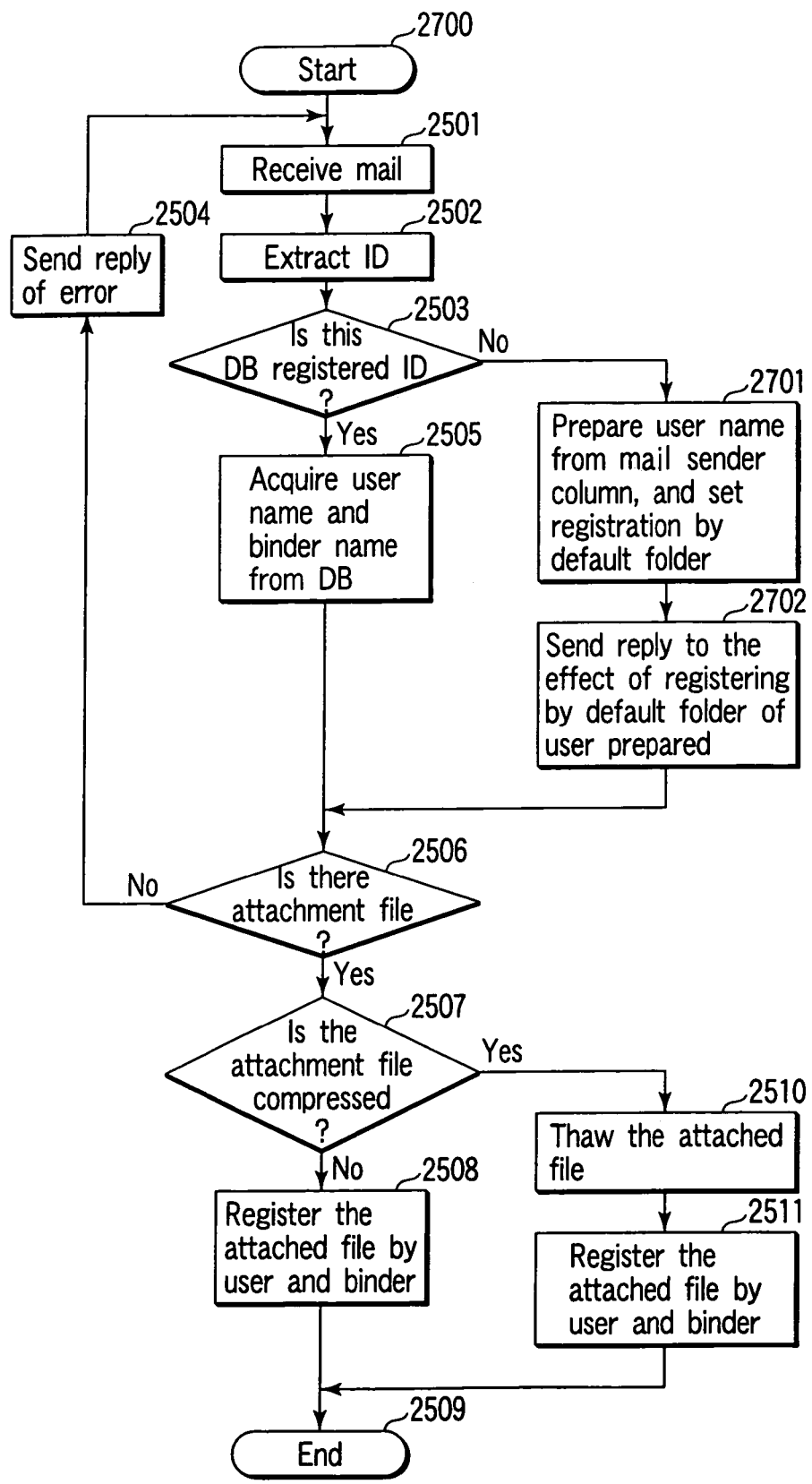
FIG. 37 is a flow chart for explaining the registration action of the server in the printing system according to the eighteenth example.

The registration operation of the server 2 in the printing system according to the eighteenth example of this invention is explained with reference to the flow chart of FIG. 37. The actions same as those of the sixteenth example are indicated by the same steps and explanation is omitted.

At first, the operation of the server 2 is started (step 2700). Steps 2501-2503 are executed.

In case the ID is one not described in the data base 23a in step 2503, the controller 21 prepares the user name from the mail sender column, and sets to effect registration in the default folder (step 2701), and further, sends to the original sender a mail of reply in the contents to the effect that the registration is to be made in the default folder of the user thus prepared (step 2702).

In case the ID is one stored in the data base 23a in step 2503, the step 2505 is executed.

And, in case the user name and the folder name are acquired from the data base 23a in step 2505, or when the default folder of the default user is set in step 2701, the controller 21 judges whether there is an attachment file or not (step 2506).

Depending on the judgment of this step 2506, the steps 2507-2511 are executed.

Next, the nineteenth example is explained.

Figure 38:
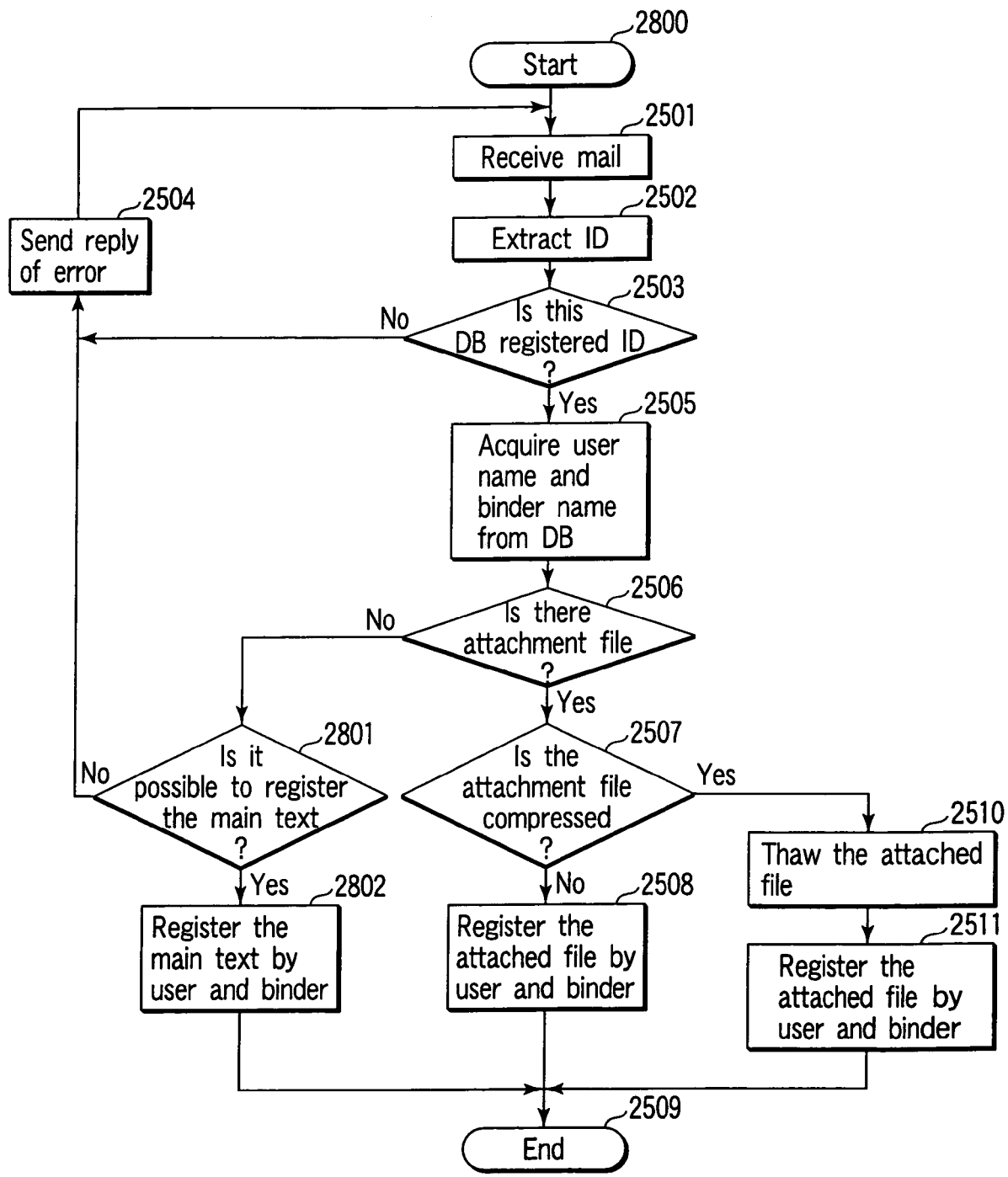
FIG. 38 is a flow chart for explaining the registration action of the server in the printing system according to the nineteenth example.

The registration operation of the server 2 in the printing system according to the nineteenth example of this invention is explained with reference to the flow chart of FIG. 38. The actions same as those of the sixteenth example are indicated by the same steps and explanation is omitted.

At first, the operation of the server 2 is started (step 2800). Steps 2501-2506 are executed.

In case there is no attachment file in step 2500, the controller 21 judges whether the main text can be stored or not (step 2801). In case the main text cannot be stored, the controller 21 sends to the original sender a reply mail of error to that effect (step 2504), and returns to the step 2501 to receive the mail.

In case the controller 21 judges that the main text can be stored in step 2801, it stores the main text (step 2802), and terminates a series of actions (step 2509).

In case there is an attachment file in step 2506, the steps 2507-2511 are executed.

Next, the twentieth example is explained.

Figure 39A:
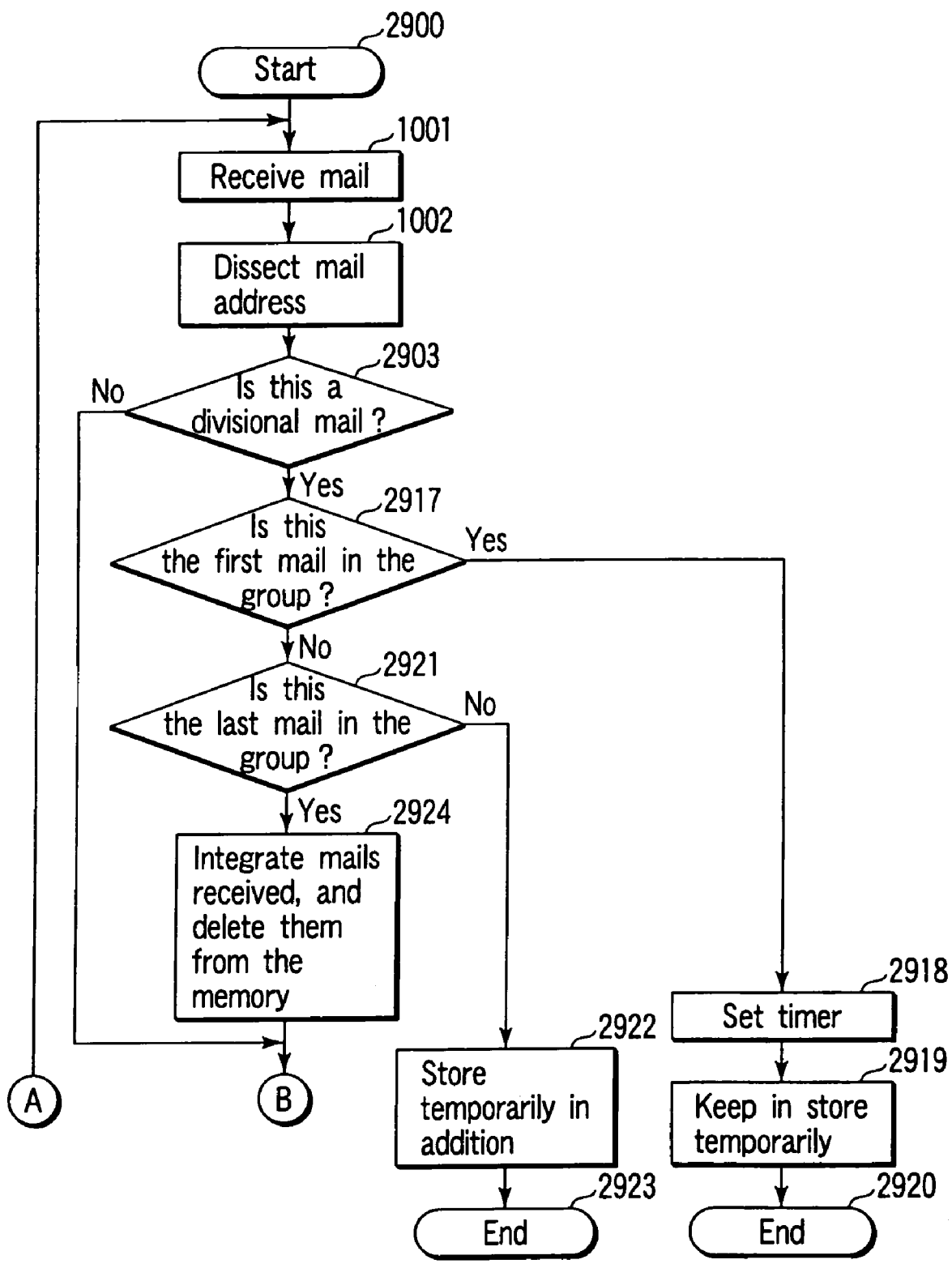
FIGS. 39A and 39B are flow charts for explaining the registration action of the server in the printing system according to the twentieth example.
Figure 39B:
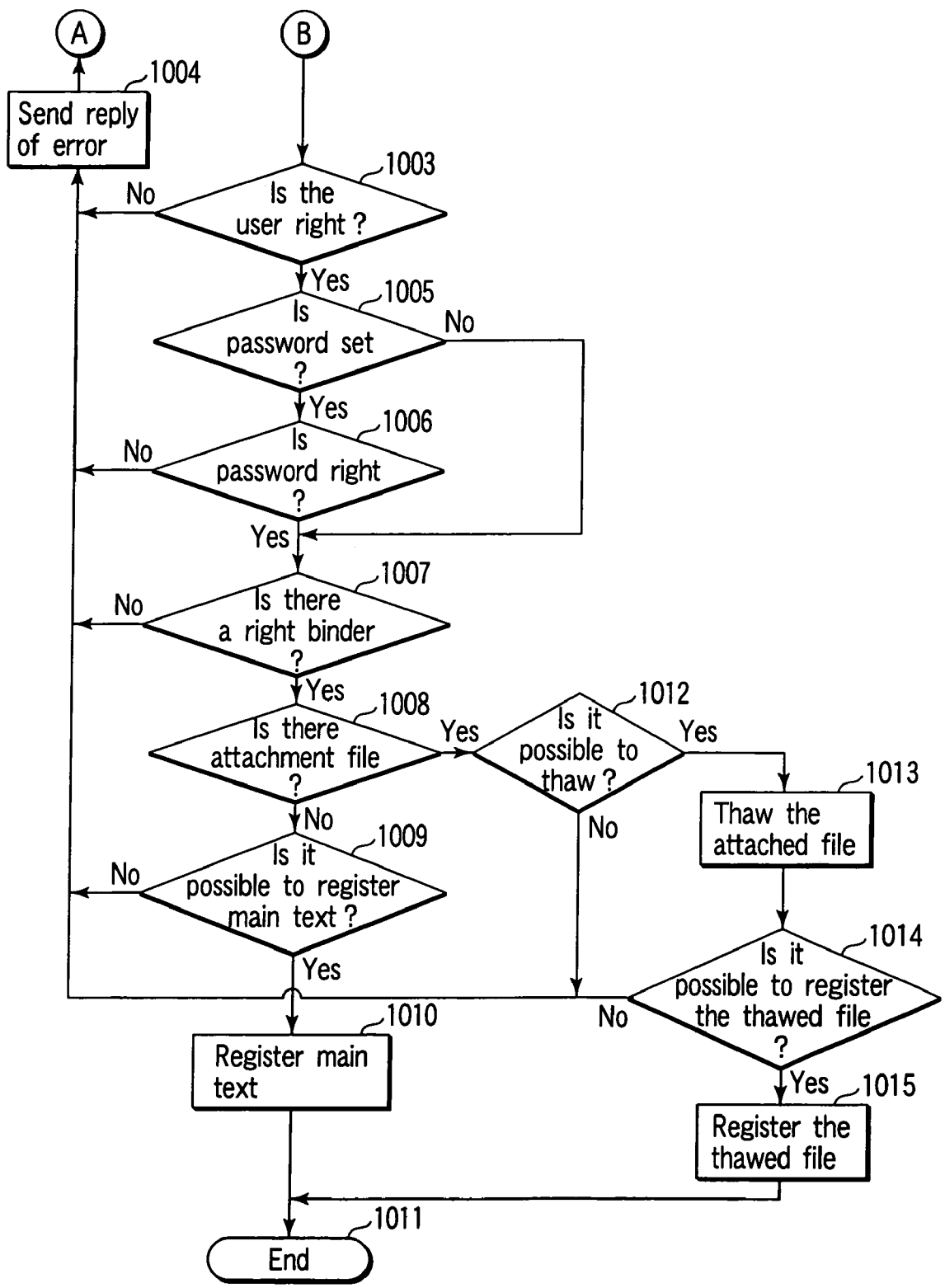

The registration operation of the server 2 in case of receiving the divisional mail in the printing system according to the twentieth example of this invention is explained with reference to the flow charts of FIGS. 39A and 39B. The actions same as those of the first example are indicated by the same steps and explanation is omitted.

At first, the operation of the server 2 is started (step 2000).

Continuously, the controller 21 of the server 2 receives the mail through the communication interface 24 (step 1001). The controller 21 dissects the header part (mail address) of the received mail (step 1002), and the controller 21 judges whether the received mail is a divisional mail or not (step 2903).

When the controller 21 has judged it to be a divisional mail in step 2903, the controller 21 judges whether it is the initially received mail in the divisional mail or not (step 2917).

When the controller 21 has judged it to be the initially received mail in the divisional mail in step 2917, the controller 21 sets the date & time of the timer 21a (step 2918), temporarily stores said received mail in a memory 22 (step 2919), and terminates the processing of this received mail part (step 2920).

In case the controller has judged it not to be the initial mail in the group in step 2917, the controller 21 judges whether it is the last mail in the group of the divisional mail or not (step 2921).

In case it is not the last mail in step 2921, the controller 21 temporarily stores (adds) said received mail as a group of the divisional mail in the memory 22 (step 2922) to terminate the processing of this received mail part (step 2923).

In case the controller has judged it to be the last mail as the group of the divisional mail in step 2921, the controller 21 integrates all the received mails stored temporarily in the memory 22 and moves to the registration processing from the latter stage step 1003, and deletes the temporary storage of the memory 22 (step 2924).

And, the controller 21 judges whether the user in the mail integrated in step 2924, or in the mail that has not been the divisional mail in step 2903 is right or not (step 1003).

Depending on the judgment in the step 1003, the steps 1004-1015 are executed.

Next, the twenty-first example is explained.

Here is shown a task that is operated in parallel with the receiving task of the divisional mail in the twentieth example. This task is a task to confirm whether the divisional mails are arrayed as a group in a certain time or not.

The operation of this server 2 is explained with reference to the flow chart of FIG. 40. In this flow chart, only the characteristic portions are extracted so as to facilitate understanding of the invention.

At first, the controller 21 of the server 2 starts to operate the task to confirm whether the divisional mails are arrayed as a group in a certain time or not (step 3000).

The controller 21 searches the temporary storage region of the memory 21a (step 3001), and judges whether there is any group of the divisional mail that has stood for a certain time from the receipt of the initial mail or not (step 3002).

Here, in case there is no group of the divisional mail that has stood for a certain time from the receipt of the initial mail, the controller 21 terminates the operation (step 3003).

In case there is any group of the divisional mail that has stood for a certain time in step 3002, the controller 21 deletes all the mails in said group (step 3004) to terminate operation (step 3003).

Next, the twenty-second example is explained.

Here is shown a task that is operated in parallel with the receiving task of the divisional mail in the twentieth example. This task is a task to confirm whether the divisional mails are arrayed as a group in a certain time or not.

The operation of this server 2 is explained with reference to the flow chart of FIG. 41. In this flow chart, only the characteristic portions are extracted so as to facilitate understanding of the invention.

At first, the controller 21 of the server 2 starts to operate the task to confirm whether the divisional mails are arrayed as a group in a certain time or not (step 3100).

The controller 21 searches the temporary storage region of the memory 21a (step 3001), and judges whether there is any group of the divisional mail that has stood for a certain time from the receipt of the initial mail or not (step 3102).

Here, in case there is no group of the divisional mail that has stood for a certain time from the receipt of the initial mail, the controller 21 terminates the operation (step 3103).

In case there is any group of the divisional mail that has stood for a certain time in step 3102, the controller 21 sends to the original sender a mail of error to the effect that all the divisional mails are not arrayed (step 3104) and terminates operation (step 3103).

Next, the twenty-third example is explained.

Here is shown a task that is operated in parallel with the receiving task of the divisional mail in the twentieth example. This task is a task to confirm whether the divisional mails are arrayed as a group in a certain time or not.

The operation of this server 2 is explained with reference to the flow chart of FIG. 42. In this flow chart, only the characteristic portions are extracted so as to facilitate understanding of the invention.

At first, the controller 21 of the server 2 starts to operate the task to confirm whether the divisional mails are arrayed as a group in a certain time or not (step 3200).

The controller 21 searches the temporary storage region of the memory 21a (step 3201), and judges whether there is any group of the divisional mail that has stood for a certain time from the receipt of the initial mail or not (step 3202).

Here, in case there is no group of the divisional mail that has stood for a certain time from the receipt of the initial mail, the controller 21 terminates the operation (step 3203).

In case there is any group of the divisional mail that has stood for a certain time in step 3202, the controller 21 sends to the original sender a mail of error to the effect that all the divisional mails are not arrayed (step 3204), deletes all the mails in said group from the temporary storage region of the memory 21a (step 3205), and terminates operation (step 3203).

As described above, there have been shown the first example through the twenty-third example. This invention may not be limited to them but be constituted by optionally combining them respectively.

As described above, according to the embodiments of this invention, printing can be realized in the same manner of handling by both the portable terminal user and the personal computer user in the internet connected apparatuses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A printing system comprising:
   a server for carrying out transmitting and receiving of mail with an information apparatus through a communication line or a network and a printing apparatus for carrying out printing by acquiring the printing information stored in said server,
   said server being equipped with:
   a receiving section configured to receive mail which is transmitted by the information apparatus and which has an ID attached thereto;
   an extracting section configured to extract the ID from the mail received by the receiving section;
   a searching section configured to search whether the ID extracted by the extracting section is an ID registered beforehand;
   a reading section configured to read out a user name corresponding to the ID where the ID extracted by the extracting section is the ID registered beforehand;
   a first determination section configured to determine whether the mail received by the receiving section includes an attached file;
   a second determination section configured to determine whether the attached file is compressed, where the first determination section determines that the mail received by the receiving section includes the attached file;
   a decompressing section configured to decompress the attached file where the second determination section determines that the attached file is compressed; and
   a registering section configured to register the attached file which is decompressed by the decompression section or the attached file which the reading section determines as not being compressed, such that the attached file is registered under the user name read out by the reading section.

2. The printing system according to claim 1, wherein if the searching section determines that the ID extracted by the extracting section is not the ID registered beforehand, then the mail is registered by use of a default folder of a default user, and mail indicating that the received mail is registered by use of the default folder of the default user registration is sent to the information apparatus.

3. The printing system according to claim 1, wherein if the searching section determines that the ID extracted by the extracting section is not the ID registered beforehand, then a user name is created from a sender of the mail, the mail is registered by use of a default folder, and mail indicating that the received mail is registered by use of the default folder of a default user registration is sent to the information apparatus.

4. The printing system according to claim 1, wherein if the first determination section determines that the mail received by the receiving section does not include an attached file, then a determination is made as to whether main text can be registered; and if the main text can be registered, then the main text is registered under the user name read out by the reading section.

5. The printing section according to claim 1, further comprising a database that stores the IDs correlated to respective user names and passwords.

6. The printing section according to claim 1, further comprising a database that stores the IDs correlated to respective combinations of user name, password, and a folder to which any attached file is to be registered.

* * * * *